INVENTOR
WILLIAM H. HANSON
BY Alfred E. Hall
ATTORNEY

United States Patent Office 3,534,404

Patented Oct. 13, 1970

3,534,404

CARRY AND COMPARATOR NETWORKS FOR MULTI-INPUT MAJORITY LOGIC ELEMENTS

William H. Hanson, Minneapolis, Minn., assignor to Sperry Rand Corporation, New York, N.Y., a corporation of Delaware Filed June 29, 1967, Ser. No. 649,968

Int. Cl. G06f 7/385; H03k 19/42, 21/16

U.S. Cl. 235—177 11 Claims

ABSTRACT OF THE DISCLOSURE

A carry generating network for generating $n$-signals $C_n \ldots C_i \ldots C_1$ corresponding to the sum of and augend $A_n \ldots A_i \ldots A_1$ and an addend $B_n \ldots B_i \ldots B_1$ which comprises a plurality of N groups $N_i=1 \ldots N$ of $m$-input majority decision logic elements where $m \geq 5$ and N is defined by the relation $$\left(\frac{m+1}{2}\right)^{N-1} \leq n \leq \left(\frac{m+1}{2}\right)^{N}$$

The specification also describes the manner in which a digital comparator can be constructed utilizing a similar logical design.

The present invention is concerned generally with a data processing system, and more particularly with such a processing system wherein the logical operations are performed by majority-decision elements.

In data processing systems, it is frequently necessary to conduct determinations of carries, comparisons, and the like, each of these operations among others capable of being performed by a number of techniques. In order to improve the reliability, speed of operation and the like, it is generally preferable that any of these processing operations be conducted with a minimum number of components consistent with the other system requirements. Since each component in the system is subject to failure, the probability of error of the system may be reduced by reducing the number of components. In addition, the speed of operation is inversely proportional to the number of logical levels included in the system, each level contributing its own integral portion of the overall delay. In order to enhance the speed of operations, and in order to increase the overall reliability of the system, majority-decision logic has been implemented in connection with various data processing operations including the determination of carries, comparisons and the like. Systems utilizing majority-decision elements in accordance with the present invention have been found to significantly increase the speed of operation and decrease the number of components required to perform a logical determination of the particular type of interest. Economical advantages accordingly are available in connection with the system of the present invention. Systems of the present invention are adaptable for use in connection with words having almost unlimited length. The advantages of operation increase with an increase in word length.

In commonly assigned copending application Ser. No. 476,458 filed Aug. 2, 1965 (now Pat. 3,372,377) and entitled Data Processing System, there is disclosed a system in which 3-input majority decision elements are used with the advantages specified above. The present invention is an improvement over the above identified copending application in that it discloses and develops the mathematical formulae necessary to design a system in which $m$-input majority decision elements may be used with an increase in the advantages mentioned above relative to speed of operation and number of components required.

Therefore, it is an object of the present invention to provide an improved data processing system employing $m$-input majority-decision elements for performing certain logical operations where $m$ is odd and $\geq 5$.

It is a further object of the present invention to provide an improved data processing system employing $m$-input majority-decision elements for high speed carry nets and for high speed comparators where $m$ is odd and $\geq 5$.

It is yet another object of the present invention to provide a data processing system employing a minimal number of $m$-input majority-decision elements to perform logical operations with a minimum number of logic levels where $m$ is odd and $\geq 5$.

Other and further objects and advantages of the present invention will become apparent to those skilled in the art upon a study of the following specification, appended claims and accompanying drawings, wherein:

Figure 5:
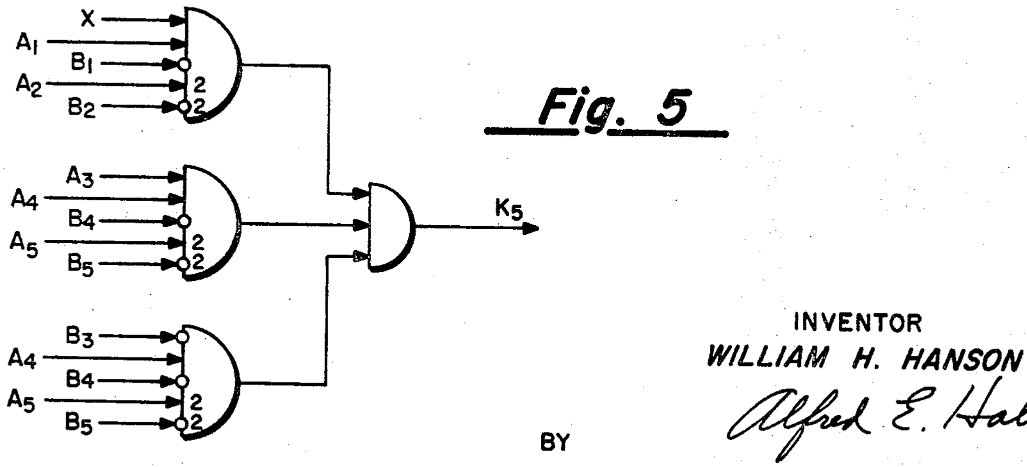
Figure 3:
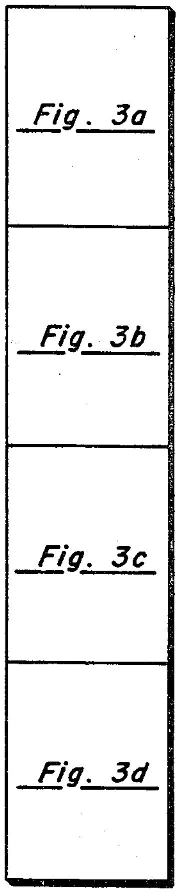
Figure 4:
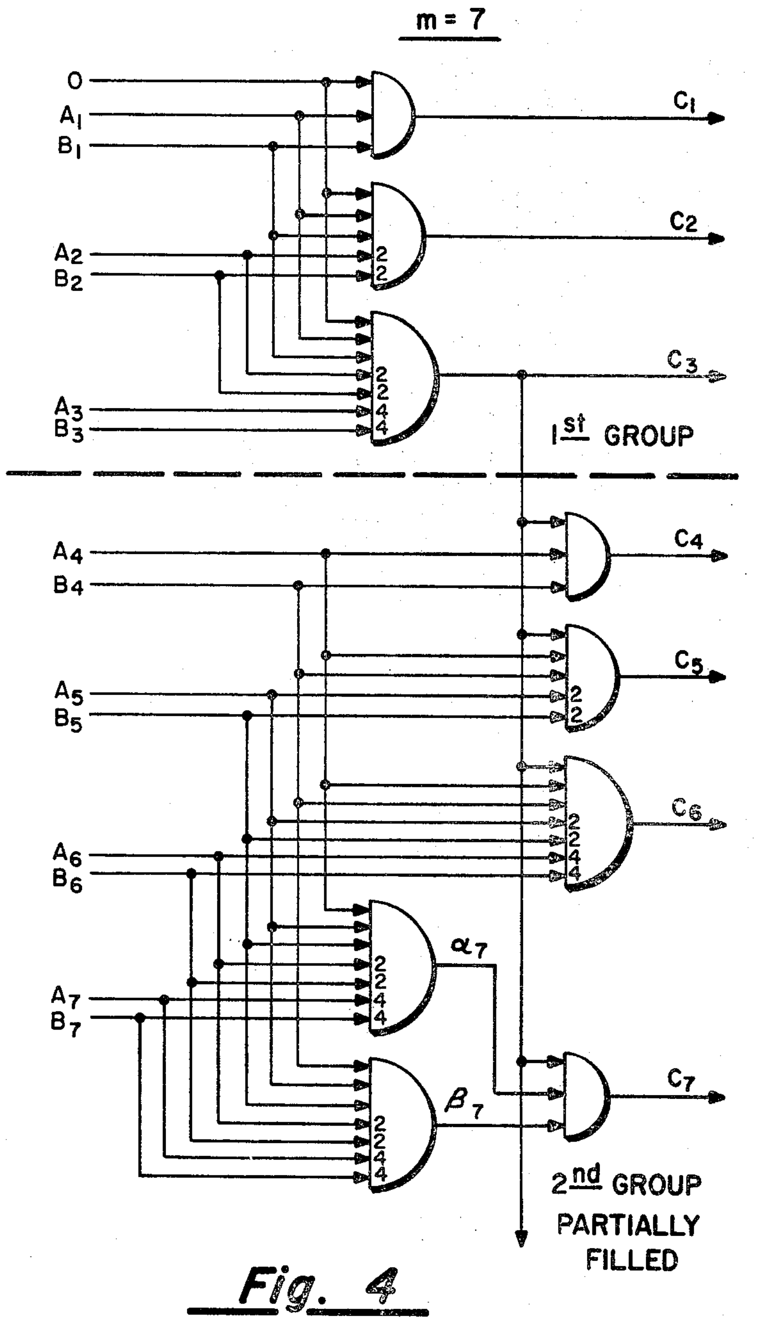
Figure 6:
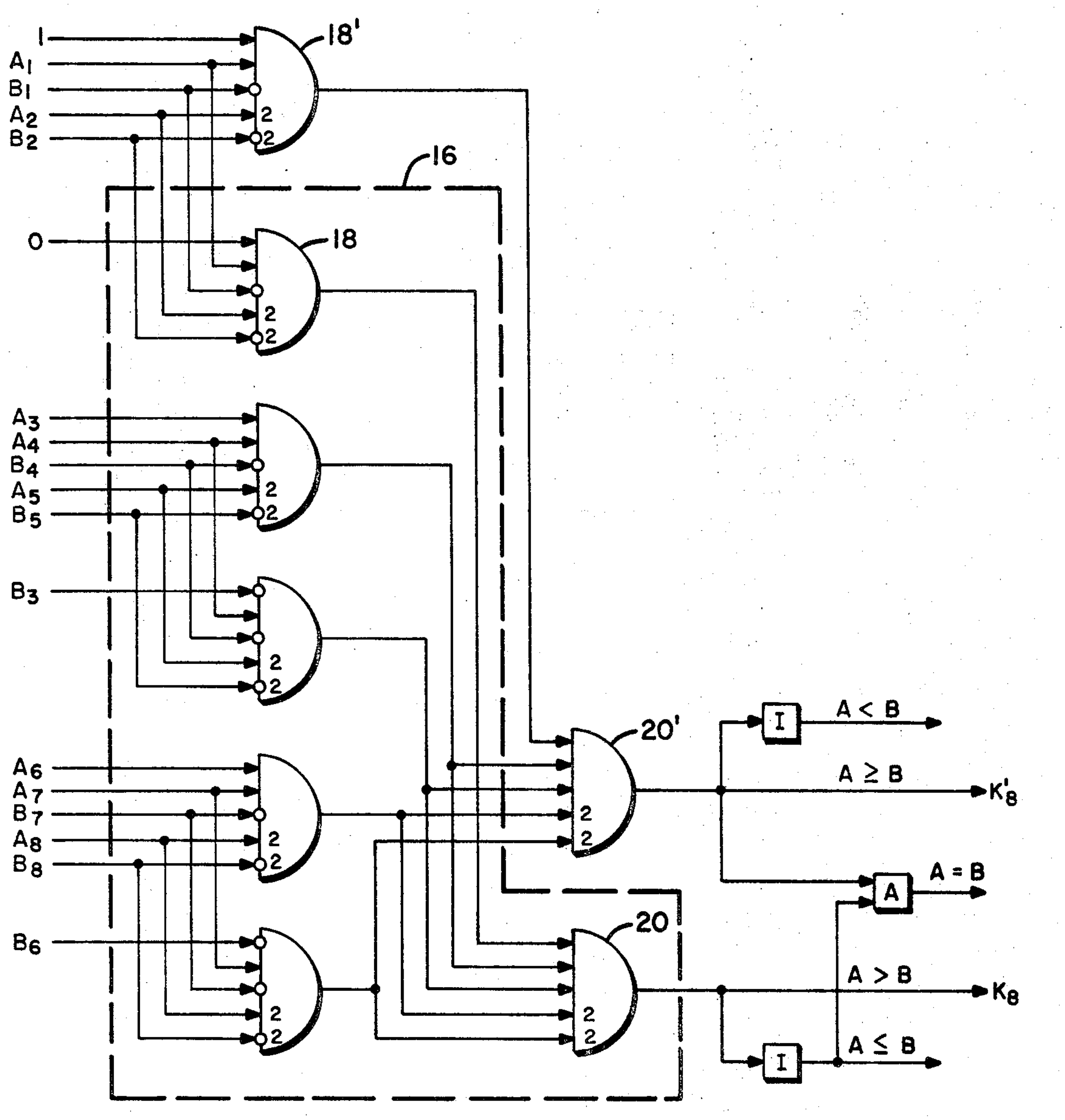

FIGS. 3a, 3b, 3c and 3d form a partial logic diagram of an $n$ bit carry net derived with majority logic elements where $m=5$;

FIG. 4 is a partial logic diagram of an $n$ bit carry net derived with majority logic elements where $m=7$;

FIG. 5 is a logic diagram of a 5 bit high speed comparator derived with $m=5$; and FIG. 6 is a logic diagram of a full parallel comparator designed in accordance with the present invention with $m=5$.

The carry from any stage of an ordinary parallel binary adder is given by the majority of 3 bits; the addend bit and the augened bit corresponding to the particular bit stage under consideration, plus the next lower-order carry. In other words, the carry for the $i$th stage of such an adder may be represented by the following equation:

$$C_i=A_i\#B_i\#C_{i-1} \quad (1)$$

In this function, the characters "#" represent a majority-decision operator. In Equation 1, $C_i$ is represented by the majority of the arguments $A_i$, $B_i$, and $C_{i-1}$. The carry, $C_{i-1}$, may be eliminated from the Equation 1 by replacing it with the function $A_{i-1}\#B_{i-1}\#C_{i-2}$. The repetition of this process can eventually eliminate all carries so that the highest order carry is ultimately expressed entirely in terms of various addend and augend bits. If, for example, $i=4$, (1) becomes $$C_4=A_4\#B_4\#\{A_3\#B_3\#[A_2\#B_2\#(A_1\#0\#B_1)]\} \quad (2)$$

Equation 2, it will be observed, includes four nested majority expressions, this expression corresponding to a diagram including four columns of elements and therefore requiring 4 periods of operation. Thus, utilizing Equation 2 in N-logic levels (delay times) the carries can be determined for $n$-bit words.

Majority-decision logic facilitates the design of networks, such as comparators, carry-determining networks and the like, which require fewer components and fewer logic levels, thus providing a corresponding increase in reliability and reduction in operating time. It has been determined that in N-logic levels (delay times) the maximum number of carries that can be generated is $$\left(\frac{m+1}{2}\right)^{N}-1$$

where $m$=the number of inputs to the majority decision elements. Further, the number of logic levels, N, necessary to generate carries corresponding towards of order $n$ is uniquely determined by the inequality $$\left(\frac{m+1}{2}\right)^{N-1} \leq n < \left(\frac{m+1}{2}\right)^{N}$$

For 7 bit words A and B, for example, with $m=3$, the method of Equation 2 would require 7 operating periods or delay times whereas the technique of the present invention permtis these operations to be conducted in only three operating periods. This advantage increases rapidly with both an increase in word length and with an increase in $m$, the number of inputs to the majority decision elements.

A simple majority-decision operation may be exemplified by the 3-input bistable parametron as illustrated in the above identified copending application. It is obvious that an $m$-input bistable parametron could be constructed in like manner where $m>3$ and is odd. This device has three coincident binary signal inputs and produces a binary output that agrees with the majority of the inputs. If at least two of the three inputs are binary "0's" the output of the majority-decision element is "0"; and if at least two of the three inputs are binary "1's" the output will be "1." In addition, one of the inputs may be permanently established as a binary "1," and in this case the majority-decision element will function as an OR element relative to the "1." If the constant input is changed to a "0," the element is modified to a 2-input AND relative to the binary "1." In place of the parametron, a tunnel diode or other type of threshold device may be successfully employed as the majority-decision element, such as for example, appropriately arranged transistor elements or the like (with a suitable input network). An $m$-input majority logic element would operate in a similar manner. It is important, however, that the unit function as a threshold device in order that the majority logic system may be properly designed.

Figure 3A:
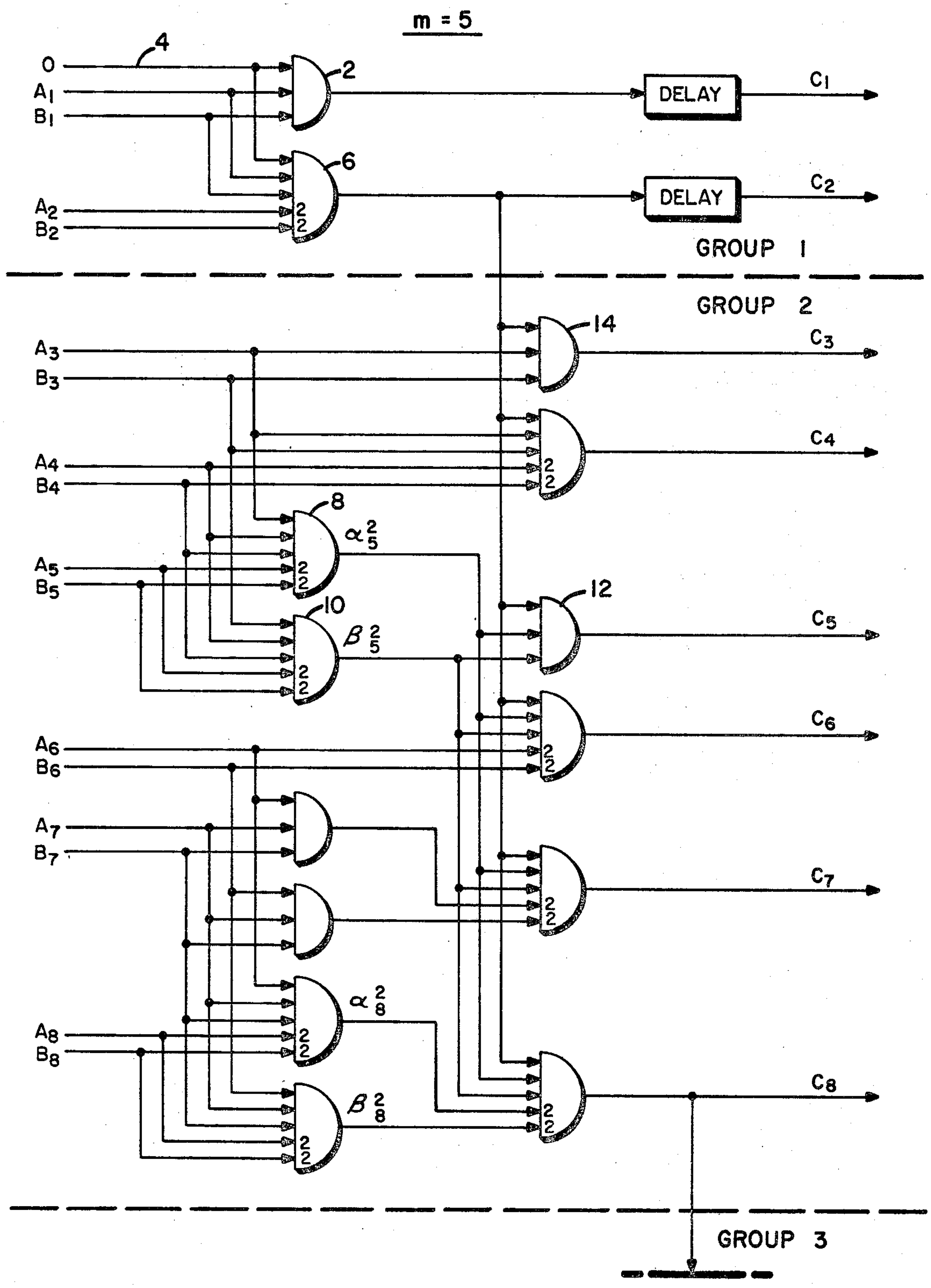
Figure 3B:
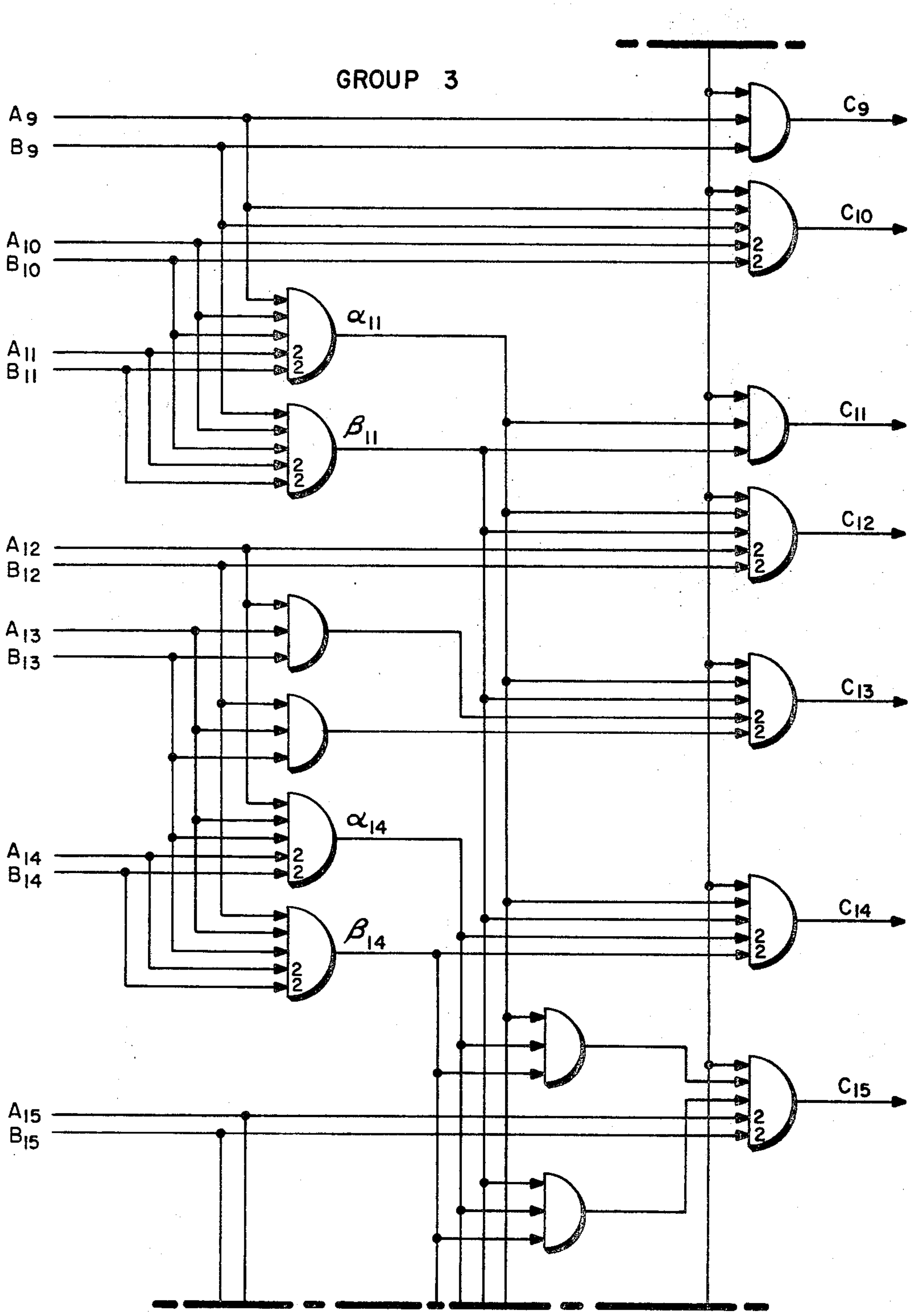
Figure 3C:
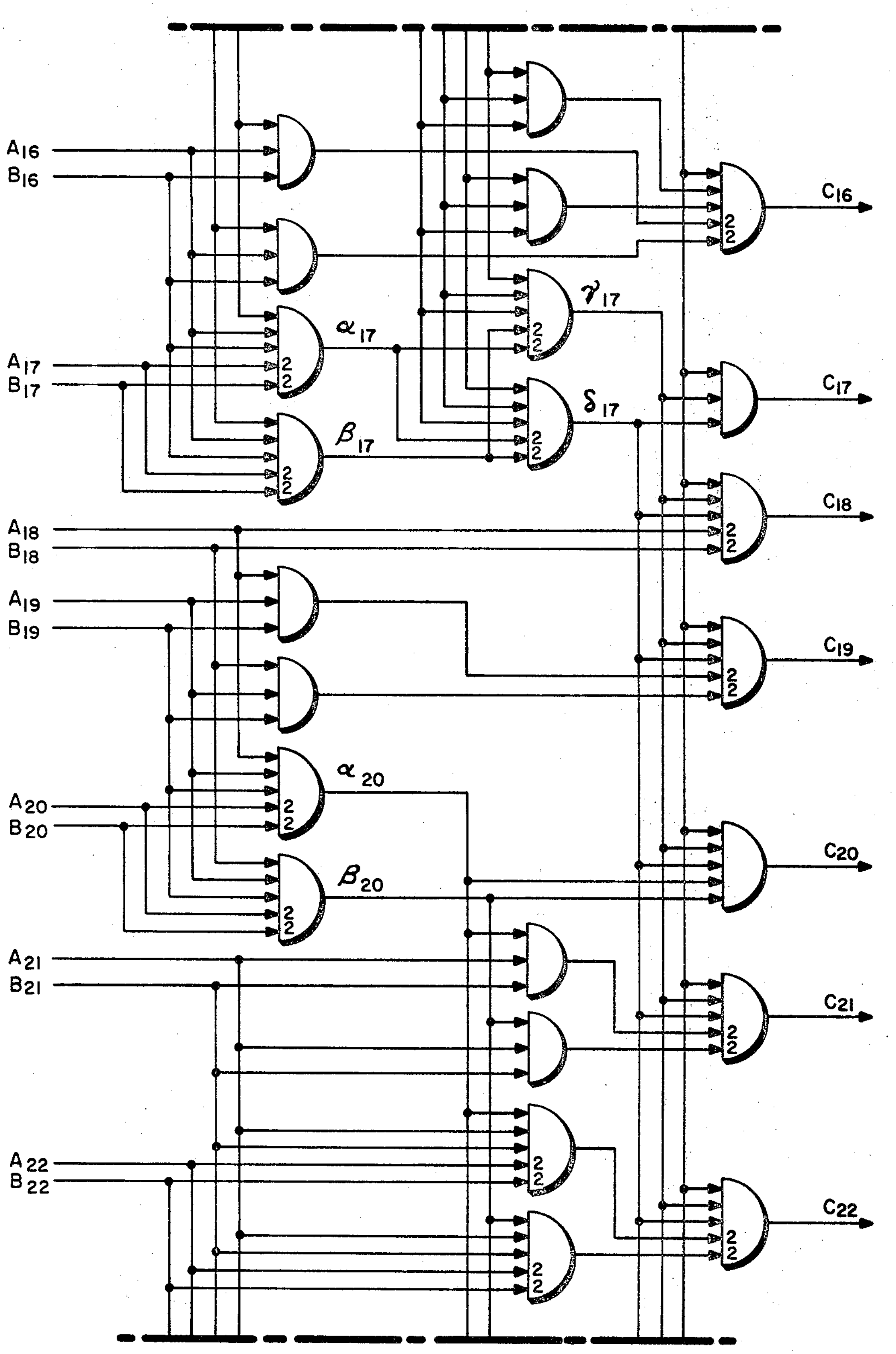
Figure 3D:
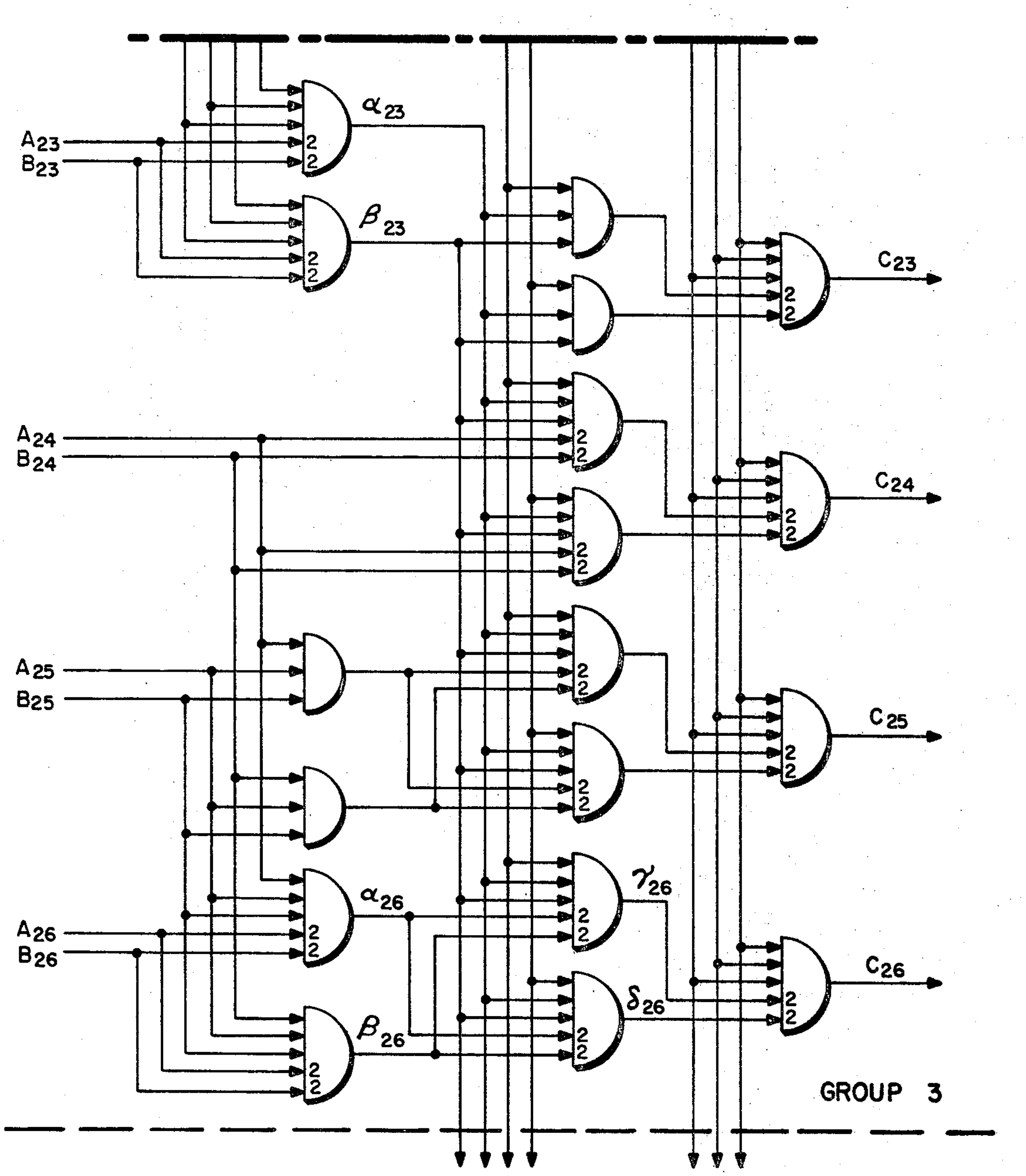

In addition to greater speed, considerably fewer components are required when majority-decision elements are employed. Time delays are used to synchronize or otherwise arrange the timing of the operation from the input portion to the output portion. To simplify the drawings, only a few delay elements are shown in FIG. 3*a*. Delay elements are inexpensive in comparison to majority-decision elements. The extent of the delay required will, of course, depend upon the individual components used in the system. Thus, in certain applications, specific delay elements having lengthy delay characteristics will be required, while in certain other applications, an extended length of conductor may be adequate to provide the delay necessary for coincidence.

The working theorems disclosed in column 3 of the above identified copending application pointed out that a $n$-bit carry function can be represented with $n$ three-input majority elements as follows:

(7) $$C_n = A_n\#B_n\#(A_{n-1}\#B_{n-1}\#(\ldots(A\#B\#0)\ldots)) = (A_n\#B_n\#A_{n-1})\#(A_n\#B_n\#B_{n-1})\#(\ldots(A\#B\#0)).$$

It can be seen that if (8) $$C_n = A_1\#A_2\#\ldots\#A_n\#(B_1\#B_2\#\ldots B_m)$$

where n is any even integer $\geq 2$ and m is any odd integer $\geq 3$, then from Equation 7 it is obvious that (9) $$C_n = (A_1\#A_2\#\ldots\#A_n\#B_1)\#(A_1\#A_2\#\ldots\#A_n\#B_2)\#\ldots\#(A_1\#A_2\#\ldots\#B_m)$$

It has been discovered that the last expression above can be written as

(10) $$C_n = (A_1\#A_2\#\ldots\#A_n\#B_1)\#(A_1\#A_2\#\ldots\#A_n\#B_2)\#\ldots\#(A_1\#A_2\#\ldots\#A_n\#B_j)\#B_{j+1}\#B_{j+2}\#\ldots\#B_m$$

where $j$ is defined as

(11) $$\frac{m+1}{2} \leq j \leq m$$

Equation 10 is known as the distributive theorem that can be proven by induction. Since Equations 8 and 10 are equal, consider first Equation 8 and then Equation 10. In Equation 8, since $n$ is an even integer, the A's either have an equal number of 0's and 1's or they do not. If they do, then they cancel and only the B's are left. It can easily be seen that this is also true with respect to Equation 10. Consider now Equation 8 where the A's do not have an equal number of 1's and 0's. The number, 1 or 0, which predominates the A's will predominate the entire expression since the parenthetical value only adds one input to the A's. Thus, if four A's and three B's are present, and if it is presumed that three of the four A's are 1's and all the B's are 0's, it can be seen that the value of the expression will be 1 since the B's are in the parenthesis which represent only 1 input to be added to the A's. Thus, there will be three A's representing 1's, one A representing a 0 and the output of the parenthetical expression representing a 0. Therefore, with three 1's and two 0's, the 1's are in the majority and the expression as a whole represents a 1. Consider now Equation 10 where the A's do not have an equal number of 1's and 0's. Since only one B term is added to each parenthetical expression, it is obvious that the A's will predominate in each parenthetical expression. Thus, as long as the nested, or parenthetical, expressions are greater in number then the added terms $B_{j+1}$, $B_{j+2}$ and $B_m$, it is obvious that the A's will predominate the entire expression. Thus, the distributive theorem is proven to be true.

It has also been discovered that the expression in Equation 8 can be written

(12) $$C_n = A_1^{\frac{m+1}{2}}\#A_2^{\frac{m+1}{2}}\#\ldots\#A_n^{\frac{m+1}{2}}\#B_1\#B_2\#\ldots\#B_m$$

where $$\frac{m+1}{2}$$

is the weight of the individual expression. This is known as the associative theorem and can also be proved by induction. It is obvious that when the A terms have equal numbers of 1's and 0's they cancel and only the B terms are left. If the A's do not have an equal number of 1's and 0's, then a minimum of two A's must have the same value to be a majority and $$2\left(\frac{m+1}{2}\right) = m+1 > m$$

Thus, the A terms must predominate. Therefore, the associative theorem is proven to be true.

Using the distributive and associative theorems expressed in Equations 10 and 12, it can be shown that an $n$-bit carry function can be represented with a network of $m$-input quasi-majority logic elements that requires only N delay periods where

(13) $$\left(\frac{m+1}{2}\right)^{N-1} \leq n < \left(\frac{m+1}{2}\right)^{N}$$

For example, a carry for a 26 bit wtrd ($n=26$) with 5 input ($m=5$) majority logic elements can be performed in 3 logic levels or delay periods according to Equation 13. Thus, $3^{N-1} \leq 26 < 3^N$ and $N=3$.

The distributive and associative theorms disclosed above can be used to construct a carry generator utilizing majority logic elements with $m$-inputs for generating $n$ signals $C_n \ldots C_i \ldots C_1$ representative of carries corresponding to an augend of the form $A_n \ldots A_i \ldots A_1$ and an addend of the form $B_n \ldots B_i \ldots B_1$. The generator comprises N carry generating groups $N=1 \ldots N$ where N is defined by the relation in Equation 13 and each of said groups $N_i=1 \ldots N-1$ is coupled to the next lower carry generating group for generating $$\left(\frac{m+1}{2}\right)^{N_i}-\left(\frac{m+1}{2}\right)^{N_i-1}$$

signals representative of $$C_{\left(\frac{m+1}{2}\right)^{N_i}-1} \ldots C_{\left(\frac{m+1}{2}\right)^{N_i-1}}$$

corresponding to digit orders $$A_{\left(\frac{m+1}{2}\right)^{N_i}-1} \ldots A_{\left(\frac{m+1}{2}\right)^{N_i-1}}$$

of said augend, and digit orders $$B_{\left(\frac{m+1}{2}\right)^{N_i}-1} \ldots B_{\left(\frac{m+1}{2}\right)^{N_i-1}}$$

of said addend. Each of said groups $N_i=1 \ldots N-1$ receives signal representations of digit orders $$A_{\left(\frac{m+1}{2}\right)^{N_i}-1} \ldots A_{\left(\frac{m+1}{2}\right)^{N_i-1}}, \quad B_{\left(\frac{m+1}{2}\right)^{N_i}-1} \ldots B_{\left(\frac{m+1}{2}\right)^{N_i-1}}$$

and carry signal $$C_{\left(\frac{m+1}{2}\right)^{N_i-1}-1}$$

The carry signal is representative of the highest digit order generated by the next lower carry generating group and, if the carry expression reduces to $C_o$, then $C_o \equiv 0$. Each of said groups $N_i=1 \ldots N-$ includes a plurality of $m$-input majority logic elements, where m is odd and $\geqslant 5$, for receiving and utilizing said digit order and carry signals to generate carry signals representative of $$C_{\left(\frac{m+1}{2}\right)^{N_i}-2} \ldots C_{\left(\frac{m+1}{2}\right)^{N_i-1}}$$

and also to generate a signal representative of $$C_{\left(\frac{m+1}{2}\right)^{N_i}-1}$$

the highest order output of the group, in accordance with the function (14)

$$C_{\left(\frac{m+1}{2}\right)^{N_i}-1} = w_3\alpha_{l_3}^{N_i} \# w_3\beta_{l_3}^{N_i} \# \ldots \# w_i\alpha_{l_i}^{N_i} \# \ldots \# w_m\alpha_{l_m}^{N_i} \# w_m\beta_{l_m}^{N_i} \# C_{\left(\frac{m+1}{2}\right)^{N_i-1}-1}$$

where weight $$w_i = 2^{\left(\frac{m-i}{2}\right)}$$

and $i=3, 5, 7 \ldots m$ and designates the term of Equation 14 under consideration, $$l_i = \left(\frac{m+1}{2}\right)^{N_i} - 1 - \left(\frac{i-3}{2}\right)\left(\frac{m+1}{2}\right)^{N_i-1}$$

the alpha and beta terms are reduced to (15)

$$\alpha_q^p \equiv (\alpha_q^{p-1})^{2^{\left(\frac{m-3}{2}\right)}} \# (\beta_q^{p-1})^{2^{\left(\frac{m-3}{2}\right)}} \# \ldots \# \left[\alpha^{p-1}_{q-\left(\frac{i-3}{2}\right)\left(\frac{m+1}{2}\right)^{p-2}}\right]^{2^{\left(\frac{m-i}{2}\right)}} \# \left[\beta^{p-1}_{q-\left(\frac{i-3}{2}\right)\left(\frac{m+1}{2}\right)^{p-2}}\right]^{2^{\left(\frac{m-i}{2}\right)}} \# \ldots \# \alpha^{p-1}_{q-\left(\frac{m-3}{2}\right)\left(\frac{m+1}{2}\right)^{p-2}} \# \beta^{p-1}_{q-\left(\frac{m-3}{2}\right)\left(\frac{m+1}{2}\right)^{p-2}} \# \alpha^{p-1}_{q-\left(\frac{m-1}{2}\right)\left(\frac{m+1}{2}\right)^{p-2}}$$

where $\beta_q^p$ is the same as $\alpha_q^p$ except for the last term which should be $$\beta^{p-1}_{q-\left(\frac{m-1}{2}\right)\left(\frac{m+1}{2}\right)^{p-2}} \text{ and } \alpha_q^1 \equiv A_q,\ \beta_q^1 \equiv \beta_q$$

and $C_o \equiv 0$.

The carry generating group $N_i=N$ is coupled to the next lower carry generating group for generating $$n - \sum_{N-1}^{N_i=1} \left(\frac{m+1}{2}\right)^{N_i} - \left(\frac{m+1}{2}\right)^{N_i-1}$$

signals representative of carries $$C_n \ldots C_{\left(\frac{m+1}{2}\right)^{N_i-1}}$$

corresponding to digit orders $$A_n \ldots A_{\left(\frac{m+1}{2}\right)^{N_i-1}}$$

of said augend, and digit orders $$B_n \ldots B_{\left(\frac{m+1}{2}\right)^{N_i-1}}$$

of said addend. This group receives signal representations of digit orders $$A_n \ldots A_{\left(\frac{m+1}{2}\right)^{N_i-1}},\ B \ldots B_{n\left(\frac{m+1}{2}\right)^{N_i-1}}$$

and carry signal $$C_{\left(\frac{m+1}{2}\right)^{N_i-1}-1}$$

the latter being representative of the highest digit order carry generated by the next lower carry generating group and includes at least one $m$-input majority logic element for receiving and utilizing said digti order and carry signals to generate signals representative of $$C_{n-1} \ldots C_{\left(\frac{m+1}{2}\right)^{N-1}}$$

and to generate a signal representative of $C_n$ in no more than N logic levels if $$n < \left(\frac{m+1}{2}\right)^N - 1$$

and to generate $C_n$ in accordance with the function (16)

$$C_n = w_3\alpha_{l_3}^N \# w_3\beta_{l_3}^N \# \ldots \# w_i\alpha_{l_i}^N \# w_i\beta_{l_i}^N \# \ldots \# w_m\alpha_{l_m}^N \# w_m\beta_{l_m}^N \# C_{\left(\frac{m+1}{2}\right)^{N-1}-1} \text{ if } n = \left(\frac{m+1}{2}\right)^N - 1$$

Examination of Equation 14 reveals that when $m=3$ is substituted therein it reduces to the equivalent of Equation 10 in column 6 of the above identified copending application. The differences that exist are due to the fact that the first group in the copending case was numbered as the 0th group while it is numbered as the 1st group in the present case.

Figure 1:
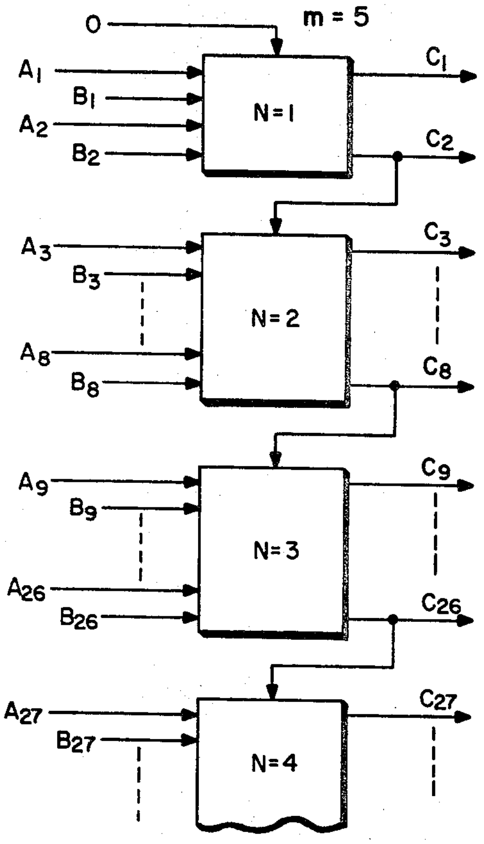
FIG. 1 is a block diagram of the inventive circuit where $m=5$ and $N=4$.

If $m=5$ substituted in Equation 14, the configuration shown in FIG. 1 is obtained. Thus, using the expression in Equation 13 as stated previously, if $n=26$ and $m=5$, then $N=3$, and three delay periods or logic levels are required. Further, the expression $$\left(\frac{m+1}{2}\right)^{N_i}-\left(\frac{m+1}{2}\right)^{N_i-1}$$

indicates how many signals each group generates. Thus, group 1 generates $3^1-3^0=3=1-2$ signals. Likewise, group 2 generates $3^2-3^1=9-3=6$ signals. The signals in other groups of FIG. 5 can likewise be determined.

The first and last signals in each group are defined by the equation $$C_{\left(\frac{m+1}{2}\right)^{N_i}-1} \ldots C_{\left(\frac{m+1}{2}\right)^{N_i-1}}$$

Thus, with $m=5$ as shown in FIG. 5, in group 1 the first and last signals are $$C_{(3)^1-1} \ldots C_{(3)^{1-1}}=C_2 \ldots C_1$$

Similarly, for group 2, the signals are $$C_{(3)^2-1} \ldots C_{(3)^{2-1}}=C_8 \ldots C_3$$

The signals for other groups can be determined in like manner.

The number of signals $C_p$ produced by a partially filled group can be determined by substracting the number of carry signals produced by the lower order groups from the total number of signals produced. The equation is therefore written $$C=n-\sum_{N_i=1}^{N-1}\left(\frac{m+1}{2}\right)^{N_i}-\left(\frac{m+1}{2}\right)^{N_i-1}$$

Thus, if $n=30$, from 13, $N=4$ and $C_p=30$ $$-\Sigma[3^1-3^0]+[3^2-3^1]+[3^3-3^2]=30-[2+6+]=4$$

It will be seen from FIG. 1 that the highest order ouput carry from each group is coupled as an input to the next highest order group. As will be shown in FIGS. 3*a*, 3*b* 3*c* and 3*d*, the highest order carry signal from any group is coupled to each majority logic element producing a carry output in the next higher order grou or stage.

Figure 2:
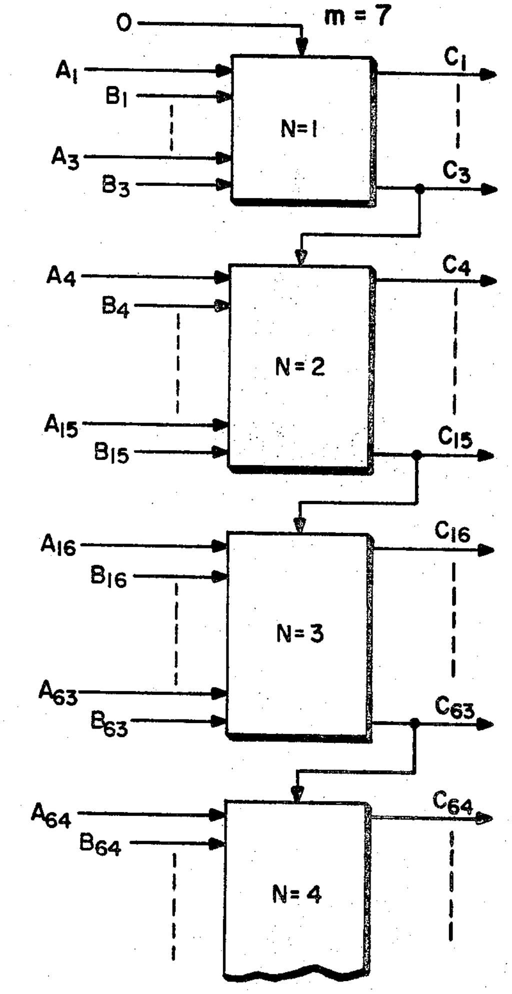
FIG. 2 is a block diagram of the inventive circuit where $m=7$ and $N=4$.

By examining the above equations with $m=7$ substituted therein, it will be seen that the structure disclosed in FIG. 2 is obtianed. Thus while the equations have been reduced to the blcok structures shown in FIG. 1 and FIG. 2 for $m=5$ and $m=7$ respectively, it is obvious that substitutions of $m=9$, $m=11$, etc. can also be made.

The equations for a three delay period ($N=3$), 26-bit carry net using five input ($m=5$) quasi-majority logic elements are in Table I as follows where, because of the expansion $$\text{(17)}\quad \alpha_i=A_i^2\#B_i^2\#A_{i-1}\#B_{i-1}\#A_{i-2}$$
$$\text{(18)}\quad \beta_i=A_i^2\#B_i^2\#A_{i-1}\#B_{i-1}\#B_{i-2}$$
$$\text{(19)}\quad \gamma_i=\alpha_i^2\#\beta_i^2\#\alpha_{i-3}\#\beta_{i-3}\#\alpha_{i-6}$$
$$\text{(20)}\quad \delta_i=\alpha_i^2\#\beta_i^2\#\alpha_{i-3}\#\beta_{i-3}\#\beta_{i-6}$$

TABLE I $$\begin{aligned}
C_1 &=A_1\#B_1\#0\\
C_2 &=A_2\#B_2\#C_1=A_2\#B_2\#(A_1\#B_1\#0)=A_2^2\#B_2^2\#A_1\#B_1\#0\\
C_3 &=A_3\#B_3\#C_2\\
C_4 &=A_4\#B_4\#C_3=A_4\#B_4\#(A_3\#\beta_3\#C_2)=A_4^2\#B_4^2\#A_3\#B_3\#C_2\\
C_5 &=A_5\#B_5\#C_4=A_5\#B_5\#(A_4\#B_4\#C_3)=A_5^2\#B_5^2\#A_4\#B_4\#C_3\\
&=A_5^2\#B_5^2\#A_4\#B_4\#(A_3\#B_3\#C_2)\\
&=[A_5^2\#B_5^2\#A_4\#B_4\#A_3]\#[A_5^2\#B_5^2\#A_4\#B_4\#B_3]\#C_2\\
&=\alpha_5\#\beta_5\#C_2\\
C_6 &=A_6\#B_6\#C_5=A_6\#B_6\#(\alpha_5\#\beta_5\#C_2)=A_6^2\#B_6^2\#\alpha_5\#\beta_5\#C_2\\
C_7 &=A_7\#B_7\#C_6=A_7\#B_7\#(A_6\#B_6\#C_5)\\
&=(A_7\#B_7\#A_6)\#(A_7\#B_7\#B_6)\#C_5=(A_7\#B_7\#A_6)\#(A_7\#B_7\#B_6)\#(\alpha_5\#\beta_5\#C_2)\\
&=(A_7\#B_7\#A_6)^2\#(A_7\#B_7\#B_6)^2\#\alpha_5\#\beta_5\#C_2\\
C_8 &=A_8\#B_8\#C_7=A_8\#B_8\#(A_7\#B_7\#C_6)\\
&=A_8^2\#B_8^2\#A_7\#B_7\#C_6=A_8^2\#B_8^2\#A_7\#B_7\#(A_6\#B_6\#C_5)\\
&=(A_8^2\#B_8^2\#A_7\#B_7\#A_6)\#(A_8^2\#B_8^2\#A_7\#B_7\#B_6)\#C_5\\
&=(A_8^2\#B_8^2\#A_7\#B_7\#A_6)\#(A_8^2\#B_8^2\#A_7\#B_7\#B_6\#(\alpha_5\#\beta_5\#C_2)\\
&=(A_8^2\#B_8^2\#A_7\#B_7\#A_6)^2\#(A_8^2\#B_8^2\#A_7\#B_7\#B_6)^2\#\alpha_5\#\beta_5\#C_2\\
&=\alpha_8^2\#B_8^2\#\alpha_5\#\beta_5\#C_2\\
C_9 &=A_9\#B_9\#C_8\\
C_{10} &=A_{10}\#B_{10}\#C_9=A_{10}\#B_{10}\#(A_9\#B_9\#C_8)\\
&=A_{10}^2\#B_{10}^2\#A_9\#B_9\#C_8\\
C_{11} &=A_{11}\#B_{11}\#C_{10}=A_{11}\#B_{11}\#(A_{10}\#B_{10}\#C_9)=A_{11}^2\#B_{11}^2\#A_{10}\#B_{10}\#C_9\\
&=A_{11}^2\#B_{11}^2\#A_{10}\#B_{10}\#(A_9\#B_9\#C_8)\\
&=(A_{11}^2\#B_{11}^2\#A_{10}\#B_{10}\#A_9)\#(A_{11}^2\#B_{11}^2\#A_{10}\#B_{10}\#B_9)\#C_8\\
&=\alpha_{11}\#\beta_{11}\#C_8\\
C_{12} &=A_{12}\#B_{12}C_{11}=A_{12}\#B_{12}\#(\alpha_{11}\#\beta_{11}\#C_8)\\
&=A_{12}^2\#B_{12}^2\#\alpha_{11}\#\beta_{11}\#C_8\\
C_{13} &=A_{13}\#B_{13}\#C_{12}=A_{13}\#B_{13}\#(A_{12}\#B_{12}\#C_{11})\\
&=(A_{13}\#B_{13}\#A_{12})\#(A_{13}\#B_{13}\#B_{12})\#C_{11}\\
&=(A_{13}\#B_{13}\#A_{12})\#(A_{13}\#B_{13}\#B_{12})\#(\alpha_{11}\#\beta_{11}\#C_8)\\
&=(A_{13}\#B_{13}\#A_{12})^2\#(A_{13}\#B_{13}\#B_{12})^2\#\alpha_{11}\#\beta_{11}\#C_8\\
C_{14} &=A_{14}\#B_{14}\#C_{13}=A_{14}\#B_{14}\#(A_{13}\#B_{13}\#C_{12})\\
&=A_{14}^2\#B_{14}^2\#A_{13}\#B_{13}\#C_{12}\\
&=A_{14}^2\#B_{14}^2\#A_{13}\#B_{13}\#(A_{12}\#B_{12}\#C_{11})\\
&=(A_{14}^2\#B_{14}^2\#A_{13}\#B_{13}\#A_{12})\#(A_{14}^2\#B_{14}^2\#A_{13}\#B_{13}\#B_{12})\#C_{11}\\
&=(A_{14}^2\#B_{14}^2\#A_{13}\#B_{13}\#A_{12})\#(A_{14}^2\#B_{14}^2\#A_{13}\#B_{13}\#B_{12})\#(\alpha_{11}\#\beta_{11}\#C_8)\\
&=\alpha_{14}\#\beta_{14}\#(\alpha_{11}\#\beta_{11}\#C_8)=\alpha_{14}^2\#\beta_{14}^2\#\alpha_{11}\#\beta_{11}\#C_8\\
C_{15} &=A_{15}\#B_{15}\#C_{14}=A_{15}\#B_{15}\#[(\alpha_{14}\#\beta_{14}\#\alpha_{11})\#(\alpha_{14}\#\beta_{14}\#\beta_{11})\#C_8]\\
&=A_{15}^2\#B_{15}^2\#(\alpha_{14}\#\beta_{14}\#\alpha_{15})\#(\alpha_{14}\#\beta_{14}\#\beta_n)\#C_8\\
C_{16} &=A_{16}\#B_{16}\#C_{15}=A_{16}\#B_{16}\#(A_{15}\#B_{15}\#C_{14})\\
&=(A_{16}\#B_{16}\#A_{15})\#(A_{16}\#B_{16}\#B_{15})\#C_{14}\\
&=(A_{16}\#B_{16}\#A_{15})\#(A_{16}\#B_{16}\#B_{15})\#[(\alpha_{14}\#\beta_{14}\#\alpha_{11})\#(\alpha_{14}\#\beta_{14}\#\beta_{11})\#C_8]\\
&=(A_{16}\#B_{16}\#A_{15})^2\#(A_{16}\#B_{16}\#B_{15})^2\#(\alpha_{14}\#\beta_{14}\#\alpha_{11})\#(\alpha_{14}\#\beta_{14}\#\beta_{11})\#C_8\\
C_{17} &=A_{17}\#B_{17}\#C_{16}=A_{17}\#B_{17}\#(A_{16}\#B_{16}\#C_{15})\\
&=A_{17}^2\#B_{17}^2\#A_{16}\#B_{16}\#(A_{15}\#B_{15}\#C_{14})\\
&=(A_{17}^2\#B_{17}^2\#A_{16}\#B_{16}\#A_{15})\#(A_{17}^2\#B_{17}^2\#A_{16}\#B_{16}\#B_{15})\#C_{14}\\
&=\alpha_{17}\#\beta_{17}\#[\alpha_{14}\#\beta_{14}\#(\alpha_{11}\#\beta_{11}\#C_8)]\\
&=\alpha_{17}^2\#\beta_{17}^2\#\alpha_{14}\#\beta_{14}\#(\alpha_{11}\#\beta_{11}\#C_8)\\
&=(\alpha_{17}^2\#\beta_{17}^2\#\alpha_{14}\#\beta_{14}\#\alpha_{11})\#(\alpha_{17}^2\#\beta_{17}^2\#\alpha_{14}\#\beta_{14}\#\beta_{14})\#C_8\\
&=\gamma_{17}\#\delta_{17}\#C_8
\end{aligned}$$

TABLE I—Continued $$C_{18}=A_{18}\#B_{18}\#C_{17}=A_{18}\#B_{18}\#(\gamma_{17}\#\delta_{17}\#C_8)$$
$$=A_{18}{}^2\#B_{18}{}^2\#\gamma_{17}\#\delta_{17}\#C_8$$
$$C_{19}=A_{19}\#B_{19}\#C_{18}=A_{19}\#B_{19}\#A_{18}\#B_{18}\#(\gamma_{17}\#\delta_{17}\#C_8)$$
$$=(A_{19}\#B_{19}\#A_{18})\#(A_{19}\#B_{19}\#B_{18})\#(\gamma_{17}\#\delta_{17}\#C_8$$
$$=(A_{19}\#B_{19}\#A_{18})^2\#(B_{19}\#B_{19}\#B_{18})^2\#\gamma_{17}\#\delta_{17}\#C_8$$
$$C_{20}=A_{20}\#B_{20}\#C_{19}=A_{20}\#B_{20}\#(A_{19}\#B_{19}\#C_{18})$$
$$=A_{20}{}^2\#B_{20}{}^2\#A_{19}\#B_{19}\#[A_{18}\#B_{18}(\gamma_{17}\#\delta_{17}\#C_8)]$$
$$=(A_{20}{}^2\#B_{20}{}^2\#A_{19}\#B_{19}\#A_{18})\#(A_{20}{}^2\#B_{20}{}^2\#A_{19}\#B_{19}\#B_{18})\#(\gamma_{17}\#\delta_{17}\#C_8)$$
$$=\alpha_{20}\#\beta_{20}\#(\gamma_{17}\#\delta_{17}\#C_8)=(\alpha_{20})^2\#(\beta_{20})^2\#\gamma_{17}\#\delta_{17}\#C_8$$
$$C_{21}=A_{21}\#B_{21}\#C_{20}=A_{21}\#B_{21}\#[\alpha_{20}\#\beta_{20}\#(\gamma_{17}\#\delta_{17}\#C_8)]$$
$$=(A_{21}\#B_{21}\#\alpha_{20})\#(A_{21}\#B_{21}\#\beta_{20})\#(\gamma_{17}\#\delta_{17}\#C_8)$$
$$=(A_{21}\#B_{21}\#\alpha_{20})^2\#(A_{21}\#B_{21}\#\beta_{20})^2\#\gamma_{17}\#\delta_{17}\#C_8$$
$$C_{22}=A_{22}\#B_{22}\#C_{21}=A_{22}\#B_{22}\#(A_{21}\#B_{21}\#C_{20})$$
$$=A_{22}{}^2\#B_{22}{}^2\#A_{21}\#B_{21}\#C_{20}=A_{22}{}^2\#B_{22}{}^2\#A_{21}\#B_{21}\#[\alpha_{20}\#\beta_{20}\#(\gamma_{17}\#\delta_{17}\#C_8)]$$
$$=[A_{22}{}^2\#B_{22}{}^2\#A_{21}\#B_{21}\#\alpha_{20}]\#[A_{22}{}^2\#B_{22}{}^2\#A_{21}\#B_{21}\#\beta_{20}]\#(\gamma_{17}\#\delta_{17}\#C_8)$$
$$=[A_{22}{}^2\#B_{22}{}^2\#A_{21}\#B_{21}\#\alpha_{20}]^2\#[A_{22}{}^2\#B_{22}{}^2\#A_{21}\#B_{21}\#\beta_{20}]^2\#\gamma_{17}\#\delta_{17}\#C_8$$
$$C_{23}=A_{23}\#B_{23}\#C_{22}=A_{23}\#B_{23}\#(A_{22}\#B_{22}\#C_{21})$$
$$=A_{23}{}^2\#B_{23}{}^2\#A_{22}\#B_{22}\#(A_{21}\#B_{21}\#C_{20})$$
$$=(A_{23}{}^2\#B_{23}{}^2\#A_{22}\#B_{22}\#A_{21})\#(A_{23}{}^2\#B_{23}{}^2\#A_{22}\#B_{22}\#B_{21})\#C_{20}$$
$$=\alpha_{23}\#\beta_{23}\#C_{20}=\alpha_{23}\#\beta_{23}\#[\alpha_{20}\#\beta_{20}\#(\gamma_{17}\#\delta_{17}\#C_8)]$$
$$=(\alpha_{23}\#\beta_{23}\#\alpha_{20})\#(\alpha_{23}\#\beta_{23}\#\beta_{20})\#(\gamma_{17}\#\delta_{17}\#C_8)$$
$$=(\alpha_{23}\#\beta_{23}\#\alpha_{20})^2\#(\alpha_{23}\#\beta_{23}\#\beta_{20})^2\#\gamma_{17}\#\delta_{17}\#C_8$$
$$C_{24}=A_{24}\#B_{24}\#C_{23}=A_{24}\#B_{24}\#(\alpha_{23}\#\beta_{23}\#C_{20})$$
$$=A_{24}{}^2\#B_{24}{}^2\#\alpha_{23}\#\beta_{23}\#[\alpha_{20}\#\beta_{20}\#(\gamma_{17}\#\delta_{17}\#C_8)]$$
$$=(A_{24}{}^2\#B_{24}{}^2\#\alpha_{23}\#\beta_{23}\#\alpha_{20})\#(A_{24}{}^2\#B_{24}{}^2\#\alpha_{23}\#\beta_{23}\#\beta_{20})\#(\gamma_{17}\#\delta_{17}\#C_8)$$
$$=(A_{24}{}^2\#B_{24}{}^2\#\alpha_{23}\#\beta_{23}\#\alpha_{20})^2\#(A_{24}{}^2\#B_{24}{}^2\#\alpha_{23}\#\beta_{23}\#\beta_{20})^2\#\gamma_{17}\#\delta_{17}\#C_8$$
$$C_{25}=A_{25}\#B_{25}\#C_{24}=A_{25}\#B_{25}\#[A_{24}\#B_{24}\#(\alpha_{23}\#\beta_{23}\#C_{20})]$$
$$=(A_{25}\#B_{25}\#A_{24})\#(A_{25}\#B_{25}\#B_{24})\#(\alpha_{23}\#\beta_{23}\#C_{20})$$
$$=(A_{25}\#B_{25}\#A_{24})^2\#(A_{25}\#B_{25}\#B_{24})^2\#\alpha_{23}\#\beta_{23}\#[\alpha_{20}\#\beta_{20}\#(\gamma_{17}\#\delta_{17}\#C_8)]$$
$$=[(A_{25}\#B_{25}\#A_{24})^2\#(A_{25}\#B_{25}\#B_{24})^2\#\alpha_{23}\#\beta_{23}\#\alpha_{20}]$$
$$=[(A_{25}\#B_{25}\#A_{24})^2\#(A_{25}\#B_{25}\#B_{24})^2\#\alpha_{23}\#\beta_{23}\#\alpha_{20}]\#[(A_{25}\#B_{25}\#A_{24})^2\#(A_{25}\#B_{25}\#B_{24})^2\#\alpha_{23}\#\beta_{23}\#\beta_{20}]\#(\alpha_{17}\#\delta_{17}\#C_8)$$
$$=[(A_{25}\#B_{25}\#A_{24})^2\#(A_{25}\#B_{25}\#B_{24})^2\#\alpha_{23}\#\beta_{23}\#\alpha_{20}]^2\#[(A_{25}\#B_{25}\#A_{24})^2\#(A_{25}\#B_{25}\#B_{24})^2\#\alpha_{23}\#\beta_{23}\#\beta_{20}]^2\#\gamma_{17}\#\delta_{17}\#C_8$$
$$C_{26}=A_{26}\#B_{26}\#C_{25}=A_{26}\#B_{26}\#(A_{25}\#B_{25}\#C_{24})$$
$$=A_{26}{}^2\#B_{26}{}^2\#A_{25}\#B_{25}\#[A_{24}\#B_{24}\#(\alpha_{23}\#\beta_{23}\#C_{20})]$$
$$=(A_{26}{}^2\#B_{26}{}^2\#A_{25}\#B_{25}\#A_{24})\#(A_{26}{}^2\#B_{26}{}^2\#A_{25}\#B_{25}\#B_{24})\#(\alpha_{23}\#\beta_{23}\#C_{20})=\alpha_{26}\#\beta_{26}\#(\alpha_{23}\#\beta_{23}\#C_{20})$$
$$=\alpha_{26}{}^2\#\beta_{26}{}^2\#\alpha_{23}\#\beta_{23}\#[\alpha_{20}\#\beta_{20}\#(\gamma_{17}\#\delta_{17}\#C_8)]$$
$$=[\alpha_{26}{}^2\#\beta_{26}{}^2\#\alpha_{23}\#\beta_{23}\#\alpha_{20}]\#[\alpha_{26}{}^2\#\beta_{26}{}^2\#\alpha_{23}\#\beta_{23}\#\beta_{20}]\#(\alpha_{17}\#\delta_{17}\#C_8)$$
$$=[\alpha_{26}{}^2\#\beta_{26}{}^2\#\alpha_{23}\#\beta_{23}\#\alpha_{20}]^2\#[\alpha_{26}{}^2\#\beta_{26}{}^2\#\alpha_{23}\#\beta_{23}\#\beta_{20}]^2\#\gamma_{17}\#\delta_{17}\#C_8$$
$$=\gamma_{26}{}^2\#\delta_{26}{}^2\#\gamma_{17}\#\delta_{17}\#C_8$$

Reference is made to FIGS. 3*a*, 3*b* and 3*c* and 3*d* of the drawings wherein an $n$ bit carry net for determining carriers corresponding to an augend and an addend of order 26, is shown. The carriers for the first 8 bit orders are determined in 2 periods or delay times utilizing a minimum of majority-decision elements; a total of only 14 elements being utilized. It will be appreciated that the first majority-decision element 2 is provided with an unconditional binary "0" on input line 4 thereby forming a conventional AND circuit. Element 6, however, uses not only the inputs to element 2 but also digit orders $A_2$ and $B_2$ both of which are coupled to element 6 with a threshold of 2 so indicated in FIG. 3*a*.

It will be noted in group 2 that each of the majority logic elements that produce an output carry signal receives as one input the highest output carry $C_2$ from group 1, the next lower group. It will also be noted that the highest order carry from group 2, $C_8$, is coupled as an input to group 3 and, in fact, is coupled to each of the majority logic elements in group 3 that produces an output carry signal. Further investigation reveals that this principle is always true. The highest order carry in any group is always connected as an input to each majority logic element producing a carry in the next higher order group. FIGS. 3*a*, 3*b*, 3*c* and 3*d* show the implementation of a carry network utilizing majority logic elements where $m=5$ and $n=26$.

In Table II, a set of working equations are shown for $m=7$ and $n=15$. The first 7 carries represented by these equations are shown implemented in FIG. 4. It is obivous from FIG. 2 that with $m=7$, carries for 63 bits can be performed by 3 groups in 3 delay periods as compared to 26 bits by 3 groups in 3 delay periods when $m=5$.

TABLE II $$C_1=A_1\#B_1\#0$$
$$C_2=A_2\#B_2\#C_1=A_2\#B_2\#(A_1\#B_1\#0)=A_2{}^2\#B_2{}^2\#A_1\#B_1\#0$$
$$C_3=A_3\#B_3\#C_2=A_3\#B_3\#(A_2\#B_2\#C_1)$$
$$=A_3\#B_3\#[A_2\#B_2\#(A_1\#B_1\#0)]$$
$$=A_3{}^4\#B_3{}^4\#A_2{}^2\#B_2{}^2A_1\#B_1\#0$$
$$C_4=A_4\#B_4\#C_3$$
$$C_5=A_5\#B_5\#C_4=A_5\#B_5\#(A_4\#B_4\#C_3)=A_5{}^2\#B_5{}^2\#A_4\#B_4\#C_3$$
$$C_6=A_6\#B_6\#C_5=A_6\#B_6\#(A_5{}^2\#B_5{}^2\#A_4\#B_4\#C_3)$$
$$=A_6{}^4\#B_6{}^4\#A_5{}^2\#B_5{}^2\#A_4\#B_4\#C_3$$
$$C_7=A_7\#B_7\#C_6=A_7\#B_7\#[A_6\#B_6\#(A_5\#B_5\#C_4)]$$
$$=A_7{}^4\#B_7{}^4\#A_6{}^2\#B_6{}^2\#A_5\#B_5\#(A_4\#B_4\#C_3)=\alpha_7\#\beta_7\#C_3$$
$$C_8=A_8\#B_8\#C_7=A_8\#B_8\#[A_7\#B_7\#(A_6\#B_6\#C_5)]$$
$$=A_8{}^4\#B_8{}^4\#A_7{}^2\#B_7{}^2\#A_6\#B_6\#(A_5\#B_5\#C_4)$$
$$=\alpha_8\#\beta_8\#(A_4\#B_4\#C_3)=\alpha_8{}^2\#\beta_8{}^2\#A_4\#B_4\#C_3$$
$$C_9=A_9\#B_9\#C_8=A_9\#B_9\#[A_8\#B_8\#(A_7\#B_7\#C_6)]$$
$$=A_9{}^4\#B_9{}^4\#A_8{}^2\#B_8{}^2\#A_7\#B_7\#[A_6\#B_6\#(A_5\#B_5\#C_4)]$$
$$=\alpha_9\#\beta_9\#[A_5\#B_5\#(A_4\#B_4\#C_3)]$$
$$=\alpha_9{}^4\#\beta_9{}^4\#A_5{}^2\#B_5{}^2\#A_4\#B_4\#C_3$$
$$C_{10}=A_{10}\#B_{10}\#C_9=A_{10}\#B_{10}\#[A_9\#B_9\#(A_8\#B_8\#C_7)]$$
$$=A_{10}{}^4\#B_{10}{}^4\#A_9{}^2\#B_9{}^2\#A_8\#B_8\#[A_7\#B_7\#(A_6\#B_6\#C_5)]$$
$$=\alpha_{10}\#\beta_{10}\#[A_6\#B_6\#(A_5\#B_5\#C_4)]$$
$$=\alpha_{10}\#\beta_{10}\#\{A_6\#B_6\#[A_5\#B_5\#(A_4\#B_4\#C_3)]\}$$
$$=\alpha_{10}{}^4\#\beta_{10}{}^4\#A_6{}^2\#B_6{}^2\#A_5\#B_5\#(A_4\#B_4\#C_3)$$

TABLE II—Continued $$=[\alpha_{10}{}^4\#\beta_{10}{}^4\#A_6{}^2\#B_6{}^2\#A_5\#B_5\#A_4]\#[\alpha_{10}{}^4\#\beta_{10}{}^4\#A_6{}^2\#B_6{}^2\#A_5\#B_5\#B_4]\#C_3$$
$$C_{11}=A_{11}\#B_{11}\#C_{10}=A_{11}\#B_{11}\#[A_{10}\#B_{10}\#(A_9\#B_9\#C_8)]$$
$$=A_{11}{}^4\#B_{11}{}^4\#A_{10}{}^2\#B_{10}{}^2\#A_9\#B_9\#[A_8\#B_8\#(A_7\#B_7\#C_6)]$$
$$=\alpha_{11}\#\beta_{11}\#[A_7\#B_7\#(A_6\#B_6\#C_5)]$$
$$=\alpha_{11}\#\beta_{11}\#\{A_7\#B_7\#[A_6\#B_6\#(A_5\#B_5\#C_4)]\}$$
$$=\alpha_{11}\#\beta_{11}\#[A_7{}^4\#B_7{}^4\#A_6{}^2\#B_6{}^2\#A_5\#B_5\#(A_4\#B_4\#C_3)]$$
$$=\alpha_{11}\#\beta_{11}\#[\alpha_7\#\beta_7\#C_3]=\alpha_{11}\#\beta_{11}\#C_7$$
$$=\alpha_{11}{}^2\#\beta_{11}{}^2\#\alpha_7\#\beta_7\#C_3$$
$$C_{12}=A_{12}\#B_{12}\#C_{11}=A_{12}\#B_{12}\#[A_{11}\#B_{11}\#(A_{10}\#B_{10}\#C_9)]$$
$$=A_{12}{}^4\#B_{12}{}^4\#A_{11}{}^2\#B_{11}{}^2\#A_{10}\#B_{10}\#[A_9\#B_9\#(A_8\#B_8\#C_7)]$$
$$=\alpha_{12}\#\beta_{12}\#\{A_8\#B_8\#[A_7\#B_7\#(A_6\#B_6\#C_5)]\}$$
$$=\alpha_{12}\#\beta_{12}\#\{A_8{}^4\#B_8{}^4\#A_7{}^2\#B_7{}^2\#A_6\#B_6\#(A_5\#B_5\#C_4)\}$$
$$=\alpha_{12}\#\beta_{12}\#[\alpha_8\#\beta_8\#(A_4\#B_4\#C_3)]$$
$$=\alpha_{12}{}^4\#\beta_{12}{}^4\#\alpha_8{}^2\#\beta_8{}^2\#A_4B_4\#C_3$$
$$C_{13}=A_{13}\#B_{13}\#C_{12}=A_{13}\#B_{13}\#[A_{12}\#B_{12}\#(A_{11}\#B_{11}\#C_{10})]$$
$$=A_{13}{}^4\#B_{13}{}^4\#A_{12}{}^2\#B_{12}{}^2\#A_{11}\#B_{11}\#[A_{10}\#B_{10}\#(A_9\#B_9\#C_8)]$$
$$=\alpha_{13}\#\beta_{13}\#\{A_9\#B_9\#[A_8\#B_8\#(A_7\#B_7\#C_6)]\}$$
$$=\alpha_{13}\#\beta_{13}\#[A_9{}^4\#B_9{}^4\#A_8{}^2\#B_8{}^2\#A_7\#B_7\#(A_6\#B_6\#C_5)]$$
$$=\alpha_{13}\#\beta_{13}\#[\alpha_9\#\beta_9\#(A_5\#B_5\#C_4)]$$
$$=\alpha_{13}{}^4\#\beta_{13}{}^4\#\alpha_9{}^2\#\beta_9{}^2\#A_5\#B_5\#(A_4\#B_4\#C_3)$$
$$=[\alpha_{13}{}^4\#\beta_{13}{}^4\#\alpha_9{}^2\#\beta_9{}^2\#A_5\#B_5\#A_4]\#[\alpha_{13}{}^4\#\beta_{13}{}^4\#\alpha_9{}^2\#\beta_9{}^2\#A_5\#B_5\#B_4]\#C_3$$
$$C_{14}=A_{14}\#B_{14}\#C_{13}=A_{14}\#B_{14}\#[A_{13}\#B_{13}\#(A_{12}\#B_{12}\#C_{11})]$$
$$=A_{14}{}^4\#B_{14}{}^4\#A_{13}{}^2\#B_{13}{}^2\#A_{12}\#B_{12}\#[A_{11}\#B_{11}\#(A_{10}\#B_{10}\#C_9)]$$
$$=\alpha_{14}\#\beta_{14}\#\{A_{10}\#B_{10}\#[A_9\#B_9\#(A_8\#B_8\#C_7)]\}$$
$$=\alpha_{14}\#\beta_{14}\#\{A_{10}{}^4\#B_{10}{}^4\#A_9{}^2\#B_9{}^2\#A_8\#B_8\#[A_7\#B_7\#(A_6\#B_6\#C_5)]\}$$
$$=\alpha_{14}\#\beta_{14}\#[\alpha_{10}\#\beta_{10}\#(A_6\#B_6\#C_5)]$$
$$=\alpha_{14}{}^4\#\beta_{14}{}^4\#\alpha_{10}{}^2\#\beta_{10}{}^2\#A_6\#B_6\#(A_5\#B_5\#C_4)$$
$$=[\alpha_{14}{}^4\#\beta_{14}{}^4\#\alpha_{10}{}^2\#\beta_{10}{}^2\#A_6\#B_6\#A_5]\#[\alpha_{14}{}^4\#\beta_{14}{}^4\#\alpha_{10}{}^2\#\beta_{10}{}^2\#A_6\#B_6\#B_5]\#(A_4\#B_4\#C_3)$$
$$=[\alpha_{14}{}^4\#\beta_{14}{}^4\#\alpha_{10}{}^2\#\beta_{10}{}^2\#A_6\#B_6\#A_5]^2\#[\alpha_{14}{}^4\#\beta_{14}{}^4\#\alpha_{10}{}^2\#\beta_{10}{}^2\#A_6\#B_6\#B_5]^2\#A_4\#B_4\#C_3$$
$$C_{15}=A_{15}\#B_{15}\#C_{14}=A_{15}\#B_{15}\#[A_{14}\#B_{14}\#(A_{13}\#B_{13}\#C_{12})]$$
$$=A_{15}{}^4\#B_{15}{}^4\#A_{14}{}^2\#B_{14}{}^2\#A_{13}\#B_{13}\#[A_{12}\#B_{12}\#(A_{11}\#B_{11}\#C_{10})]$$
$$=\alpha_{15}\#\beta_{15}\#\{A_{11}\#B_{11}\#[A_{10}\#B_{10}\#(A_9\#B_9\#C_8)]\}$$
$$=\alpha_{15}\#\beta_{15}\#\{A_{11}{}^4\#B_{11}{}^4\#A_{10}{}^2\#B_{10}{}^2\#A_9\#B_9\#[A_8\#B_8\#(A_7\#B_7\#C_6)]\}$$
$$=\alpha_{15}\#\beta_{15}\#\{\alpha_{11}\#\beta_{11}\#[A_7\#B_7\#(A_6\#B_6\#(A_5\#B_5\#C_4))]\}$$
$$=\alpha_{15}\#\beta_{15}\#\{\alpha_{11}\#\beta_{11}\#[A_7{}^4\#B_7{}^4\#A_6{}^2\#B_6{}^2\#A_5\#B_5\#(A_4\#B_4\#C_3)]\}$$
$$=\alpha_{15}\#\beta_{15}\#[\alpha_{11}\#\beta_{11}\#(\alpha_7\#\beta_7\#C_3)]$$
$$=\alpha_{15}{}^4\#\beta_{15}{}^4\#\alpha_{11}{}^2\#\beta_{11}{}^2\#\alpha_7\#\beta_7\#C_3$$

These examples are for purposes of illustration only and are not intended to be limiting.

Referring now to FIG. 5, a comparator circuit using $m$-input majority-decision elements is illustrated, this circuit being based upon the identical logic structure as utilized in the carry net of FIGS. 3*a*, 3*b*, 3*c* and 3*d*. In order to appropriately operate as a comparator, one of the word inputs must be negated throughout the system, such as for example, the B input. This is represented by the small circle in FIG. 5. Furthermore, since specific carries for comparisons are not utilized in this circuit, at least one of the majority-decision elements may be omitted. In addition, delay elements to provide coincident output will not be required however, means to provide simultaneous inputs to various components of the system will be retained. The comparator as shown in FIG. 5 will, if X is a "0," give a "1" output for $A>B$ and a "0" output for $A\leqslant B$. If X is a "1," the comparator will give a "1" output for $A\geqslant B$ and a "0" output for $A<B$. If the output of the comparator is negated and applied as a feed back signal in place of the X signal, an interesting effect is produced. If the individual inputs A and B are continuously applied, the output becomes an alternating series, for example, 0101 for $A=B$. This arrangement does not affect the operation of the comparator for the situation where A does not equal B. The result is that all 3 of the possible conditions, $A>B$, $A<B$ and $A=B$ can be completely distinguished in 2 periods of operation. The majority-logic comparator as illustrated in FIG. 5 is adapted to compare two multibit numbers A and B, where A and B are unsigned numbers in normal binary code and the comparison is of magnitude only. If A and B are in either of the binary notations commonly used to represent signed number in digital computers (ones-complement or two's-complement), the comparator design may be altered by reversing the negation (or lack thereof) at two inputs; the most significant bit of A and the most significant bit of B. Since both normal and complemented inputs are assumed to be available, this change leaves the remaining structure of the comparator unchanged. A modification may be incorporated into the comparator shown in FIG. 5 for use as either a continuous sensing system, or for use in alternate operating cycles capable of determining whether $A>B$ or $A<B$. If the alternate cycle system is employed wherein $X=0$ in one cycle and $X=1$ in the next operating cycle, the individual result from one cycle may be stored until the next cycle in a conventional flip-flop system or the like. Thus, the condition of word values of A being greater than B and the condition of A being equal to B may be resolved separately in succeeding cycles, and by the process of elimination the possibility of B being greater than A may also be resolved.

Similarly, the device shown in FIGS. 3*a*, 3*b*, 3*c* and 3*d* may be used as a comparator by complementing either all B inputs or all A inputs to the system. Then a comparison through the $j^{th}$ digit order, $K_j$, of A and B may be obtained at any desired output representing a carry in FIGS. 1*a*, 1*b*, and 1*c*. The number of groups N necessary to generate $K_j$ is given by $$\left(\frac{m+1}{2}\right)^{N-1}\leq j<\left(\frac{m+1}{2}\right)^{N}$$

Each group $N_i=1\ldots N-1$ receives as inputs signal representations of digit orders $$A_{\left(\frac{m+1}{2}\right)^{N_i}-1}\ldots A_{\left(\frac{m+1}{2}\right)^{N_i-1}-1}$$

$$\overline{B}_{\left(\frac{m+1}{2}\right)^{N_i}-1},\ldots\overline{B}_{\left(\frac{m+1}{2}\right)^{N_i}-1}$$

and a comparison signal $$K_{\left(\frac{m+1}{2}\right)^{N_{i-1}}-1}$$

the latter being representative of a comparison through the $$\left(\frac{m+1}{2}\right)^{N_i}-1$$

digit order and generates signals representative of $K_j$, where $$\left(\frac{m+1}{1}\right)^{N_i}-1\leq j<\left(\frac{m+1}{2}\right)^{N_i}$$

in $N_i$ logic levels. The highest order comparison generated by $N_i$ is given by:

(21) $K_j = w_3\alpha_{l_3}{}^{N_i}\#w_3\beta_{l_3}{}^{N_i}\# \ldots \#w_i\alpha_{l_i}{}^{N_i}\#w_i\beta_{l_i}{}^{N_i}\# \ldots$ $$\#w_m\alpha_{l_m}{}^{N_i}\#w_m\beta_{l_m}{}^{N_i}\#K_{\left(\frac{m+1}{1}\right)^{N_i}-1} \text{ where } w_i=2^{\left(\frac{m=1}{1}\right)}$$

$$l_i=\left(\frac{m+1}{2}\right)^{N_i}-1-\left(\frac{i-3}{2}\right)\left(\frac{m+1}{2}\right)^{N_i-1},\ \alpha_q{}^p\equiv w_3\alpha_q{}^{p-1}\#$$

$$w_3\beta_q{}^{p-1}\# \ldots$$

$$\#w_i\left[\alpha^{p-1}{}_{q-\left(\frac{i-3}{2}\right)\left(\frac{m+1}{2}\right)^{p-2}}\right]$$

$$\#w_i\left[\beta^{p-1}{}_{q-\left(\frac{i-3}{2}\right)\left(\frac{m+1}{2}\right)^{p-2}}\right]$$

$$\# \ldots \#\alpha^{p-1}{}_{q-\left(\frac{m-3}{2}\right)\left(\frac{m+1}{2}\right)^{p-2}}\#\beta^{p-1}{}_{q-\left(\frac{m-3}{2}\right)\left(\frac{m+1}{2}\right)^{p-2}}$$

$$\#\alpha^{p-1}{}_{q-\left(\frac{m-1}{2}\right)\left(\frac{m+1}{2}\right)^{p-2}},\ \beta^p{}_q\equiv w_3\alpha_q{}^{p-1}\# \ldots w_3\beta_q{}^{p-2} \ldots$$

$$\#w_i\left[\alpha^{p-1}{}_{q-\left(\frac{i-3}{2}\right)\left(\frac{m+1}{2}\right)^{p-2}}\right]$$

$$\#\left[\beta^{p-1}{}_{q-\left(\frac{i-3}{2}\right)\left(\frac{m+1}{2}\right)^{p-2}}\right]\# \ldots$$

$$\#\alpha^{p-1}{}_{q-\left(\frac{m-3}{2}\right)\left(\frac{m+1}{2}\right)^{p-2}}\#\beta^{p-1}{}_{q-\left(\frac{m-3}{2}\right)\left(\frac{m+1}{2}\right)^{p-2}}$$

$$\#\beta^{p-1}{}_{q-\left(\frac{m+1}{2}\right)\left(\frac{m-1}{2}\right)^{p-2}},\ \alpha_q{}^1\equiv A_q,\ \beta_q{}^1\equiv B_q \text{ and } K_o\equiv 0$$

The number of logic levels needed to generate $K_j$ is $N_i$. Given this minimum number of logic levels the precise manner in which $$K_{\left(\frac{m+1}{2}\right)^{N_i}-2} \ldots K_{\left(\frac{m+1}{2}\right)^{N_i-1}}$$

are generated is not critical to this invention so long as they are generated in less than $N_i$ logic levels. It is preferable to generate these comparisons with a minimum of majority logic elements. In the last group, $N_i=N$, the highest order comparison generated is $K_n$. If $$n=\left(\frac{m+1}{2}\right)^N-1$$

the last group is full and comparisons $$K_n \ldots K_{\left(\frac{m+1}{2}\right)^{N_i-1}}$$

are generated as in any other group. If $$n<\left(\frac{m+1}{2}\right)^N-1$$

the last group is not full and $$K_n \ldots K_{\left(\frac{m+1}{2}\right)^{N_i}-1}$$

are generated in no more than N logic levels utilizing a minimum number of majority logic elements. If the comparison is not to be made at outputs $C_1$, $C_3$, $C_5$, $C_7$ etc., all majority logic elements used only to form these outputs may be omitted. Thus when $$j\geq\left(\frac{m+1}{2}\right)^{N_i}-1$$

only $$K_{\left(\frac{m+1}{2}\right)^{N_i}-1}$$

need be generated by $N_i$. Hence, in FIG. 3*a*, element 2 ($C_1$), element 14 ($C_3$), element 12 ($C_5$), etc. may be omitted, if no comparison is to be made at these outputs.

Referring to FIG. 6 of the drawings a full parallel comparator, for eight bit words A and B, is shown. The numeral 16 generally indicates a comparator constructed in accordance with the embodiment shown in FIG. 5, and can be constructed from the carry generator of FIG. 3*a* by eliminating elements which do not contribute to the output, as explained above. By adding two elements, 18' and 20', a partial comparator of the type shown in FIG. 6 may be converted to a full comparator. Elements 18' and 20' are coupled in a manner similar to elements 18 and 20 to provide, simultaneously, outputs corresponding to the condition $A>B$ and $A\geqslant B$. In general, a partial comparator of the type shown in FIG. 5 can be modified to give a full comparator by the addition of N elements where each of the N additional elements generate signals in accordance with Equation 21. As shown in FIG. 6, $K_8$ is representative of the condition $$A>B \text{ and } K_8'$$

is representative of the condition $A\geqslant B$. From these two conditions the remaining three conditions can be realized as follows:

$$\overline{A\geqslant B}=A<B$$
$$\overline{A>B}=A\leqslant B$$
$$\overline{(A<B)}\cdot(A>B)=(A=B)$$

In the event $n$ is such that the last group is not full, $$K_n \text{ and } K_n'$$

are generated in accordance with the generation of $C_n$ as set forth above.

What is claimed is:

1. A majority logic carry network comprising:

(a) N stages, each stage $N_i$ having a plurality of majority logic elements for receiving binary digit order inputs $$A_{\left(\frac{m+1}{2}\right)^{N_i}-1} \ldots A_{\left(\frac{m+1}{2}\right)^{N_i-1}}$$

and $$B_{\left(\frac{m+1}{2}\right)^{N_i}-1} \ldots B_{\left(\frac{m+1}{2}\right)^{N_i-1}}$$

and binary carry input $$C_{\left(\frac{m+1}{2}\right)^{N_i-1}-1}$$

where $C_o\equiv 0$ and producing carry signals $$C_{\left(\frac{m+1}{1}\right)^{N_i}-1} \ldots C_{\left(\frac{m+1}{2}\right)^{N_i}-1}$$

where $m\geqslant 5$ and is odd and represents the maximum number of inputs received by each majority logic element in the carry net and (b) means coupling the highest order output carry from each stage to each majority logic element producing a carry output in the next highest order stage.

2. A network as in claim 1 wherein the number of stages N required to produce $n$ carries is expressed by the relation $$\left(\frac{m+1}{2}\right)^{N-1}\leqslant n<\left(\frac{m+1}{2}\right)^N$$

3. A network as in claim 2 wherein the number of carries generated by each group $N_i$ is expressed by the relation $$\left(\frac{m+1}{2}\right)^{N_i}-\left(\frac{m+1}{1}\right)^{N_i-1}$$

4. A carry generator utilizing majority logic elements with $m$-inputs where $m$ is odd and $\geqslant 5$ for generating $n$ binary signals $C_n \ldots C_i \ldots C_1$ representative of carries corresponding to an augend of the form $$A_n \ldots A_i \ldots A_1$$

and a binary addend of the form $B_n \ldots B_i \ldots B_1$, said generator comprising (a) N carry generating groups $N_i=1 \ldots N$ where $N_i$ is defined by the relation $$\left(\frac{m+1}{2}\right)^{N_i-1} \leqslant n < \left(\frac{m+1}{2}\right)^{N_i-1}$$

and where $m$=the maximum number of inputs the majority logic elements receive, said groups generating representations of said $n$ signals $$C_n \ldots C_i \ldots C_1$$

(b) means for coupling each of said carry generating groups $N_i=1 \ldots N-1$ to the next lower carry generating group, each of said groups $N_i$ generating $$\left(\frac{m+1}{2}\right)^{N_i}-\left(\frac{m+1}{2}\right)^{N_i-1}$$

signals representative of $$C_{\left(\frac{m+1}{2}\right)^{N_i}-1} \ldots C_{\left(\frac{m+1}{2}\right)^{N_i-1}}$$

and comprising (1) a plurality of $m$-input majority logic elements where $m$ is odd and $\geqslant 5$ for receiving signal representations of digit orders $$A_{\left(\frac{m+1}{2}\right)^{N_i}-1} \ldots A_{\left(\frac{m+1}{2}\right)^{N_i-1}}, B_{\left(\frac{m+1}{2}\right)^{N_i}-1} \ldots B_{\left(\frac{m+1}{2}\right)^{N_i-1}}$$

and carry signal $$C_{\left(\frac{m+1}{2}\right)^{N_i-1}-1}$$

where $C_0 \equiv 0$, said carry signal being representative of the highest digit order generated by the next lower carry generating group, for generating carry signals representative of $$C_{\left(\frac{m+1}{2}\right)^{N_i}-2} \ldots C_{\left(\frac{m+1}{2}\right)^{N_i-1}}$$

and to generate a signal representative of $$C_{\left(\frac{m+1}{2}\right)^{N_i}-1}$$

the highest order output of the group, in accordance with the function $$C_{\left(\frac{m+1}{2}\right)^{N_i}-1} = w_3\alpha_{l_3}{}^{N_i} \# w_3\beta_{l_3}{}^{N_i} \# \ldots \# w_i\alpha_{l_i}{}^{N_i} \# w_i\beta_{l_i}{}^{N_i} \# \ldots \# w_m\alpha_{lm}{}^{N_i} \# w_n\beta_m{}^{N_i} \# C_{\left(\frac{m+1}{2}\right)^{N_i-1}-1}$$

where weight $$w_i = 2^{\left(\frac{m-i}{2}\right)}$$

and $i=3, 5, 7 \ldots m$, subscript $$l_i = \left(\frac{m+1}{2}\right)^{N_i} - 1 - \left(\frac{i-3}{2}\right)\left(\frac{m+1}{2}\right)^{N_i-1},$$

$$\alpha^p_q \equiv w_3\alpha_q{}^{p-1} \# w_3\beta_q{}^{p-1} \# \ldots \# w_i\left[\alpha^{p-1}{}_{q-\left(\frac{i-3}{2}\right)\left(\frac{m+1}{2}\right)^{p-2}}\right] \# w^i\left[\beta^{p-1}{}_{q-\left(\frac{i-3}{2}\right)\left(\frac{m+1}{2}\right)^{p-2}}\right] \# \ldots \# \alpha^{p-1}{}_{q-\left(\frac{m-3}{2}\right)\left(\frac{m+1}{2}\right)^{p-2}}$$

$$\# \beta^{p-1}{}_{q-\left(\frac{m-3}{2}\right)\left(\frac{m+1}{2}\right)^{p-2}} \# \alpha^{p-1}{}_{q-\left(\frac{m-1}{2}\right)\left(\frac{m+1}{2}\right)^{p-2}}$$

$\beta_q{}^p$ is the same as $\alpha_q{}^q$ except for the last term which should be $$\beta^{p-1}{}_{q-\left(\frac{m-1}{2}\right)\left(\frac{m+1}{2}\right)^{p-2}}$$

and $$\alpha_q{}^1 \equiv A_q,\ B_q{}^1 \equiv B_q$$

and $C_0 \equiv 0$ and (c) means coupling said carry generating group $N_i=N$ to the next lower carry generating group for generating $$n - \sum_{N_i=1}^{N-1}\left(\frac{m+1}{2}\right)^{N_i} - \left(\frac{m+1}{2}\right)^{N_i-1}$$

signals representative of carries $$C_n \ldots C_{\left(\frac{m+1}{2}\right)^{N-1}}$$

said group $N_i=N$ comprising (1) a plurality of $m$-input majority logic elements where $m$ is odd and $\geqslant 5$ for receiving binary signal representation of digit orders $$A_n \ldots A_{\left(\frac{m+1}{2}\right)^{N-1}}, B_n \ldots B_{\left(\frac{m+1}{2}\right)^{N-1}}$$

and carry signal $$C_{\left(\frac{m+1}{2}\right)^{N-1}}$$

the latter being representative of the highest digit order carry generated by the next lower carry generating group, for generating carry signals representative of $$C_{n-1} \ldots C_{\left(\frac{m+1}{2}\right)^{N-1}}$$

and to generate a signal representative of $C_n$ in no more than N logic levels if $$n < \left(\frac{m+1}{2}\right)^N - 1$$

and in accordance with the function $$C_n = w_3\alpha_{l_3}{}^N \# w_3\beta_{l_3}{}^N \# \ldots \# w_i\alpha_{l_i}{}^N \# w_i\beta_{l_i}{}^N \# \ldots \# w_m\alpha_{l_m}{}^N \# w_m\beta_{l_m}{}^N \# C_{\left(\frac{m+1}{2}\right)^{N-1}-1}$$

if $n = \left(\frac{m+1}{2}\right)^N - 1$

5. A comparator for generating $n$ signals $K_n \ldots K_i \ldots K_1$ representative of comparisons through the $i^{th}$ digit order of two words A and B represented by binary signals of the form $A_n \ldots A_i \ldots A_1$ and $\overline{B}_n \ldots \overline{B}_i \ldots B_1$, said comparator comprising:

(a) N stages, each stage $N_i$ having a plurality of majority logic elements for receiving binary digit order inputs $$A_{\left(\frac{m+1}{2}\right)^{N_i}-1} \ldots A_{\left(\frac{m+1}{2}\right)^{N_i-1}}$$

and $$\overline{B}_{\left(\frac{m+1}{2}\right)^{N_i}-1} \ldots \overline{B}_{\left(\frac{m+1}{2}\right)^{N_i-1}}$$

and comparison input $$K_{\left(\frac{m+1}{2}\right)^{N_i-1}-1}$$

where $K_0\equiv 0$, and producing comparison signals $$K_{\left(\frac{m+1}{2}\right)^{N_i}-1} \ldots K_{\left(\frac{m+1}{2}\right)^{N_i-1}}$$

where $m\geqq 5$ and is odd and represents the maximum number of binary inputs received by each majority element in the comparator and (b) means coupling the highest order output comparison signal from each stage to each majority logic element used to produce a comparison signal output in the next highest order stage.

6. A comparator as in claim 5 wherein the number of stages required to produce a comparison of $n$ bits is expressed by the relation $$\left(\frac{m+1}{2}\right)^{N_i-1}\leq n<\left(\frac{m+1}{2}\right)^{N_i}$$

7. A comparator as in claim 6 wherein the number of comparisons that can be generated by each group $N_i$ is expressed by the relation $$\left(\frac{m+1}{2}\right)^{N_i}-\left(\frac{m+1}{2}\right)^{N_i-1}$$

8. A comparator utilizing majority logic elements with $m$-inputs where $m$ is odd and $\geqq 5$ for generating at least one of $n$ signals $K_n \ldots K_i \ldots K_1$ representative of comparisons through the $j^{th}$ digit order of two words A and B represented by binary signals of $A_n \ldots A_i \ldots A_1$ and $\overline{B}_n \ldots \overline{B}_i \ldots \overline{B}_1$, said comparator comprising:

(a) N comparison signal generating groups $N_i=1 \ldots N$, where N is defined by the relation $$\left(\frac{m+1}{2}\right)^{N_i-1}\leq n<\left(\frac{m+1}{2}\right)^{N_i}$$

and where $m$=the maximum number of binary inputs the majority logic elements receive, said groups generating at least one of the signal representations $K_n \ldots K_i \ldots K_1$, (b) means for coupling each of said signal generating groups $N_i=1 \ldots N-1$ to the next lower signal generating group, each of said groups $N_i$ generating at least one of $$\left(\frac{m+1}{2}\right)^{N_i}-\left(\frac{m+1}{7}\right)^{N_i-1}$$

signals representative of $$K_{\left(\frac{m+1}{2}\right)^{N_i}-1} \ldots K_{\left(\frac{m+1}{2}\right)^{N_i-1}}$$

and comprising:

(1) a plurality of $m$-input majority logic elements where $m$ is odd and $\geqq 5$ for receiving binary signal representations of digit orders $$A_{\left(\frac{m+1}{2}\right)^{N_i}-1} \ldots A_{\left(\frac{m+1}{2}\right)^{N_i-1}},$$

$$\overline{B}_{\left(\frac{m+1}{2}\right)^{N_i}-1} \ldots \overline{B}_{\left(\frac{m+1}{2}\right)^{N_i-1}}$$

and comparison signal $$K_{\left(\frac{m+1}{2}\right)^{N_i}-1}$$

where $K_0\equiv 0$, said comparison signal being representative of the highest digit order comparison generated by the next lower comparison signal generating group, for generating comparison signals representative of $$K_{\left(\frac{m+1}{2}\right)^{N_i}-2} \ldots K_{\left(\frac{m+1}{2}\right)^{N_i-1}}$$

and to generate a comparison signal representative of $$K_{\left(\frac{m+1}{2}\right)^{N_i}-1}$$

the highest order output of the group, in accordance with the function $$K_{\left(\frac{m+1}{2}\right)^{N_i}-1}=w_3\alpha_{l_3}^{N_i}\#w_3\beta_{l_3}^{N_i}\# \ldots$$

$$\#w_i\alpha_{l_i}^{N_i}\#w_i\beta_{l_i}\# \ldots \#w_m\alpha_{l_m}^{N_i}\#w_m\beta_{l_m}^{N_i}\#K_{\left(\frac{m+1}{2}\right)^{N_i-1}-1}$$

where weight $$w_i=2^{\left(\frac{m-i}{2}\right)}$$

and $i=3, 5, 7 \ldots m$, subscript $$l_i=\left(\frac{m+1}{2}\right)^{N_i}-1-\left(\frac{i-3}{2}\right)\left(\frac{m+1}{2}\right)^{N_i-1},$$

$$\alpha_q^p\equiv w_3\alpha_q^{p-1}\#w_3\beta_q^{p-1}\# \ldots \#w_i\left[\alpha^{p-1}_{q-\left(\frac{i-3}{2}\right)\left(\frac{m+1}{2}\right)^{p-2}}\right]$$

$$\#w_i\left[\beta^{p-1}_{q-\left(\frac{i-3}{2}\right)\left(\frac{m+1}{2}\right)^{p-2}}\right]\# \ldots$$

$$\#\alpha^{p-1}_{q-\left(\frac{m-3}{2}\right)\left(\frac{m+1}{2}\right)^{p-2}}\#\beta^{p-1}_{q-\left(\frac{m-3}{2}\right)\left(\frac{m+1}{2}\right)^{p-2}}$$

$$\#\alpha^{p-1}_{q-\left(\frac{m-1}{2}\right)\left(\frac{m+1}{2}\right)^{p-2}},$$

$\beta_q^p$ is the same as $\alpha_q^p$ except for the last term which should be $$\beta^{p-1}_{q-\left(\frac{m-1}{2}\right)\left(\frac{m+1}{2}\right)^{p-2}} \text{ and } \alpha_q^1\equiv A_q,\ \beta_q^1\equiv\beta_q$$

$K_0\equiv 0$ and (c) means coupling said comparison signal generating group $N_i=N$ to the next lower comparison generating group for generating at least one of $$n-\sum_{N_i=1}^{N}\left(\frac{m-1}{2}\right)^{N_i}-\left(\frac{m+1}{2}\right)^{N_i-1}$$

signals representative of comparisons $$K_n \ldots K_{\left(\frac{m+1}{2}\right)^{N_i-1}}$$

said group $N_i=N$ comprising (1) a plurality of $m$-input majority logic elements where $m$ is odd and $\geqq 5$ for receiving binary signal representations of digit orders $$A_n \ldots A_{\left(\frac{m+1}{2}\right)^{N-1}},\ \overline{B}_n \ldots \overline{B}_{\left(\frac{m+1}{2}\right)^{N-1}}$$

and comparison signal $$K_{\left(\frac{m+1}{2}\right)^{N-1}-1}$$

the latter being representative of the highest digit order comparison signal generated by the next lower comparison signal generating group, for generating comparison signals representative of $$K_{n-1} \ldots K_{\left(\frac{m+1}{2}\right)^{N-1}}$$

and to generate a signal representative of $K_n$ in no more than N logic levels if $$n<\left(\frac{m+1}{2}\right)^{N}-1$$

and in accordance with the function $$K_n=w_3\alpha_{l_3}^{N}\#w_3\beta_{l_3}^{N}\# \ldots \#w_i\alpha_{l_i}^{N}\#w_i\beta_{l_i}^{N}\# \ldots$$

$$\#w_m\alpha_{l_m}^{N}\#w_m\beta_{l_m}^{N}\#K_{\left(\frac{m+1}{2}\right)^{N-1}-1}$$

$$\text{if } n=\left(\frac{m+1}{2}\right)^{N}-1$$

9. A comparator for generating N signals $K_j$ representative of comparisons through the $j^{th}$ digit order of two words of the form $A_n \ldots A_i \ldots A_1$ and $\overline{B}_n \ldots \overline{B}_i \ldots \overline{B}_1$, said comparator comprising:

(a) N signal generating groups $N_i=1 \ldots N$, where $N_i$ is defined by the relation $$\left(\frac{m+1}{2}\right)^{N_i-1} \leq n < \left(\frac{m+1}{2}\right)^{N_i}$$

and where $m$=the maximum number of inputs the majority logic elements receive, for generating signal representations of $K_j$, (b) means coupling each of said signal generating $N_i=1 \ldots N\text{-}1$ to the next lower signal generating group, each of said groups $N_i$ generating a signal $$K_{\left(\frac{m+1}{2}\right)^{N_i}-1}$$

representative of a comparison through the $$\left[\left(\frac{m+1}{2}\right)^{N_i}-1\right]th$$

digit order of A and B and comprising:

(1) a plurality of $m$-input majority logic elements where $m$ is odd and $\geq 5$ for receiving binary signal representations of digit orders $$A_{\left(\frac{m+1}{2}\right)^{N_i}-1} \ldots A_{\left(\frac{m+1}{2}\right)^{N_i-1}},\ \overline{B}_{\left(\frac{m+1}{2}\right)^{N_i}-1} \ldots \overline{B}_{\left(\frac{m+1}{2}\right)^{N_i-1}}$$

and $$K_{\left(\frac{m+1}{2}\right)^{N_i-1}-1}$$

where $K_0 \equiv 0$, the latter being representative of the comparison generated by the next lower group, for generating a signal representative of $$K_{\left(\frac{m+1}{2}\right)^{N_i}-1}$$

in accordance with the function $$K_{\left(\frac{m+1}{2}\right)^{N_i}-1} = w_3 \alpha_{l_3}{}^{N_i} \# w_3 \beta_{l_3}{}^{N_i} \# \ldots \# w_i \alpha_{l_i}{}^{N_i} \# w_i \beta^{N}{}_{l_i}{}^{N_i} \# \ldots \# w_m \alpha_{l_m}{}^{N_i} \# w_m \beta_{l_m}{}^{N_i} \# K_{\left(\frac{m+1}{2}\right)^{N_i-1}-1}$$

where weight $$w_i = 2^{\left(\frac{m-i}{2}\right)}$$

and $i=3, 5, 7 \ldots m$, subscript $$l_i = \left(\frac{m+1}{2}\right)^{N_i} - 1 - \left(\frac{i-3}{2}\right)\left(\frac{m+1}{2}\right)^{N_i\_1},$$

$$\alpha_q{}^p \equiv w_3 \alpha_q{}^{p-1} \# w_3 \beta_q{}^{p-1} \# \ldots \# w_i \left[\alpha^{p-1}{}_{q-\left(\frac{i-3}{2}\right)\left(\frac{m+1}{2}\right)^{p-2}}\right] \# w_i \left[\beta^{p-1}{}_{q-\left(\frac{i-3}{2}\right)\left(\frac{m+1}{2}\right)^{p-2}}\right] \# \ldots \# \alpha^{p-1}{}_{q-\left(\frac{m-3}{2}\right)\left(\frac{m+1}{2}\right)^{p-2}} \# \beta^{p-1}{}_{q-\left(\frac{m-3}{2}\right)\left(\frac{m+1}{2}\right)^{p-2}} \# \alpha^{p-1}{}_{q-\left(\frac{m-1}{2}\right)\left(\frac{m+1}{2}\right)^{p-2}}$$

$\beta_q{}^p$ is the same as $\alpha_q{}^p$ except for the last term which should be $$\beta^{p-1}{}_{q-\left(\frac{m-1}{2}\right)\left(\frac{m+1}{1}\right)^{p-2}} \text{ and } \alpha_q{}^1 \equiv A_q,\ \beta_q{}^1 \equiv \beta_q$$

and $K_0 \equiv 0$ and (c) means coupling said signal generating group $N_i=N$ to the next lower signal generating group for generating $K_n$, said group $N_i=N$ comprising:

(1) a plurality of said $m$-input majority logic elements for receiving binary signal representations of $$A_n \ldots A_{\left(\frac{m+1}{2}\right)^{N-1}},\ \overline{B}_n \ldots \overline{B}_{\left(\frac{m+1}{2}\right)^{N-1}}$$

and $$K_{\left(\frac{m+1}{2}\right)^{N-1}-1}$$

the latter being representative of the comparison generated by the next lower group, for generating a signal representation of $K_n$ in no more than N logic levels if $$n < \left(\frac{m+1}{2}\right)^N - 1$$

and in accordance with the function $$K_n = w_3 \alpha_{l_3}{}^N \# w_3 \beta_{l_3}{}^N \# \ldots \# w_i \alpha_{l_i}{}^N \# w_i \beta_{l_i}{}^N \# \ldots \# w_m \alpha_{l_m}{}^N \# w_m \beta_{l_m}{}^N \# K_{\left(\frac{m+1}{2}\right)^{N-1}-1}$$

$$\text{if } n = \left(\frac{m+1}{2}\right)^N - 1$$

10. A comparator as defined in claim 9 wherein each of said groups $N_i=1 \ldots N$ the majority logic elements are arranged such that signal representations of $K_j$ are generated in N logic levels according to the relationship $$\left(\frac{m+1}{2}\right)^{N-1} \leq j < \left(\frac{m+1}{2}\right)^N$$

11. A comparator for generating 2N signals $$K_j \text{ and } K_j'$$

representative of comparisons through the $j^{th}$ digit order of two words of the form $A_n \ldots A_i \ldots A_1$ and $\overline{B}_n \ldots \overline{B}_i \ldots \overline{B}_1$, said comparator comprising:

(a) N signal generating groups $N_i=1 \ldots N$, where $N_i$ is defined by the relation $$\left(\frac{m+1}{2}\right)^{N_i-1} \leq n < \left(\frac{m+1}{2}\right)^{N_i}$$

and where $m$= the maximum number of inputs the majority logic elements receive, for generating signal representations of $$K_j \text{ and } K_j'$$

(b) means coupling each of said signal generating groups $N_i=1 \ldots N\text{-}1$ to the next lower signal generating group, each of said groups $N_i$ generating two signals $$K_{\left(\frac{m+1}{2}\right)^{N_i}-1} \text{ and } K'_{\left(\frac{m+1}{2}\right)^{N_i}-1}$$

representative of a comparison through the $$\left[\left(\frac{m+1}{2}\right)^{N_i}-1\right]th$$

digit order of A and B and comprising (1) a plurality of $m$-input majority logic elements where $m$ is odd and $\geq 5$ for receiving binary signal representations of digit orders $$A_{\left(\frac{m+1}{2}\right)^{N_i}-1} \ldots A_{\left(\frac{m+1}{2}\right)^{N_i-1}},\ \overline{B}_{\left(\frac{m+1}{2}\right)^{N_i}-1} \ldots \overline{B}_{\left(\frac{m+1}{2}\right)^{N_i-1}},\ K_{\left(\frac{m+1}{2}\right)^{N_i-1}-1} \text{ and } K'_{\left(\frac{m+1}{2}\right)^{N_i-1}-1}$$

where $$K_0 \equiv 0 \text{ and } K_0' \equiv 1$$

the latter two signal representations being representative of the comparison generated by the next lower group, for generating two signals representative of $$K_{\left(\frac{m+1}{2}\right)^{N_i}-1} \text{ and } K'_{\left(\frac{m+1}{2}\right)^{N_i}-1}$$

in accordance with the functions, $$K_{\left(\frac{m+1}{2}\right)^{N_i}-1} = w_3\alpha_{l_3}^{N_i} \# w_3\beta_{l_3}^{N_i} \# \ldots \# w_i\alpha_{l_i}^{N_i} \# w_i\beta_{l_i}^{N_i} \# \ldots \# w_m\alpha_{l_m}^{N_i} \# w_m\beta_{l_m}^{N_i} \# K_{\left(\frac{m+1}{2}\right)^{N_i-1}-1}$$

and $$K'_{\left(\frac{m+1}{2}\right)^{N_i}-1} = w_3\alpha_{l_3}^{N_i} \# w_3\beta_{l_3}^{N_i} \# \ldots \# w_i\alpha_{l_i}^{N_i} \# w_i\beta_{l_i}^{N_i} \# \ldots \# w_m\alpha_{l_m}^{N_i} \# w_m\beta_{l_m}^{N_i} \# K'_{\left(\frac{m+1}{2}\right)^{N_i-1}-1}$$

where weight $$w_i = 2\left(\frac{m-i}{2}\right)$$

and $i=3, 5, 7 \ldots m$, subscript $$l_i = \left(\frac{m+1}{2}\right)^{N_i} - 1 - \left(\frac{i-3}{2}\right)\left(\frac{m+1}{2}\right)^{N_i-1},$$

$$\alpha_q^p \equiv w_3\alpha_q^{p-1} \# w_3\beta_q^p \# \ldots w_i\left[\alpha^{p-1}_{q-\left(\frac{i-3}{2}\right)\left(\frac{m+1}{2}\right)^{p-2}}\right] \# w_i\left[\beta^{p-1}_{q-\left(\frac{i-3}{2}\right)\left(\frac{m+1}{2}\right)^{p-2}}\right] \# \ldots \# \alpha^{p-1}_{q-\left(\frac{m-3}{2}\right)\left(\frac{m+1}{2}\right)^{p-2}} \# \beta^{p-1}_{q-\left(\frac{m-3}{2}\right)\left(\frac{m+1}{2}\right)^{p-2}} \# \alpha^{p-1}_{q-\left(\frac{m-1}{2}\right)\left(\frac{m+1}{1}\right)^{p-2}},$$

$\beta_q^p$ is the same as $\alpha_q^p$ except for the last term which should be $$\beta^{p-1}_{q-\left(\frac{m-1}{2}\right)\left(\frac{m+1}{2}\right)^{p-2}} \text{ and } \alpha_q/ \equiv A_q,\ \beta_q' \equiv \beta_q$$

and $K_0=0$ and (c) means coupling said signal generating group $N_i=N$ to the next lower signal generating group for generating $$K_n \text{ and } K_n'$$

said group $N_i=N$ comprising:

(1) a plurality of said $m$-input majority logic elements for receiving binary signal representations of $$A_n \ldots A_{\left(\frac{m+1}{2}\right)^{N-1}},\ \overline{B}_n \ldots \overline{B}_{\left(\frac{m+1}{2}\right)^{N-1}},$$

$$K_{\left(\frac{m+1}{2}\right)^{N-1}-1} \text{ and } K'_{\left(\frac{m+1}{2}\right)^{N-1}-1}$$

the latter two signal representations being representative of the comparison generated by the next lower group, for generating two signals $$K_n \text{ and } K_n'$$

representative of $A>B$ and $A\geqq B$ respectively in no more than N logic levels if $$n < \left(\frac{m+1}{2}\right)^N - 1$$

and in accordance with the functions $$K_n = w_3\alpha_{l_3}^N \# w_3\beta_{l_3}^N \# \ldots \# w_i\alpha_{l_i}^N \# w_i\beta_{l_i}^N \# \ldots \# w_m\beta_{l_m}^N \# w_m\beta_{l_m}^N \# K_{\left(\frac{m+1}{2}\right)^{N-1}-1}$$

and $$K_n' = w_3\alpha_{l_3}^N \# w_3\beta_{l_3}^N \# \ldots \# w_i\alpha_{l_i}^N \# w_i\beta_{l_i}^N \# \ldots \# w_m\alpha_{l_m}^N \# w_m\beta_{l_m}^N \# K'_{\left(\frac{m+1}{2}\right)^{N-1}-1}$$

$$\text{if } n = \left(\frac{m+1}{2}\right)^N - 1$$

References Cited

UNITED STATES PATENTS

| | | | |
|---|---|---|---|
| 3,275,812 | 9/1966 | Coates et al. | 235—175 X |
| 3,299,260 | 1/1967 | Cohen | 235—174 X |
| 3,346,730 | 10/1967 | Hanson | 235—177 X |
| 3,350,685 | 10/1967 | Lindaman | 235—177 X |
| 3,372,377 | 3/1968 | Cohen et al. | 235—175 X |

OTHER REFERENCES

Knoebel, R. A.: Anticipated Carry Majority Logic Mode; Bedford, Mass; The Mitre Corporation, prepared under Contract AF33(600)239852, Project 708, April 1963. Copy available through Defense Documentation Center for Scientific and Technical Information, Cameron Station, Alexandria, Va., catalogued as AD 407560.

Sauer, W. A.: How to Achieve Majority and Threshold Logic with Semiconductors, in Electronics, 36(48): pp. 23–25, Nov. 29, 1963.

MALCOLM A. MORRISON, Primary Examiner

R. S. DILDINE, Jr., Assistant Examiner

U.S. Cl. X.R.

235—173

UNITED STATES PATENT OFFICE

Certificate of Correction

Patent No. 3,534,404 October 13, 1970

William H. Hanson

It is certified that error appears in the above-identified patent and that said Letters Patent are hereby corrected as shown below.

Column 14, line 57, "$C_{\left(\frac{m+1}{1}\right)}$" should read —$C\left(\frac{m+1}{2}\right)$—. Column 15, line 11, cancel "-1", second occurrence. Column 16, line 4, "$\alpha_q^d$" should read —$\alpha_q^p$—; line 33, after the formula insert — -1—; line 61, ". . . $B_l$" should read —. . . $\bar{B}_l$—. Column 17, line 6, after "majority" insert —logic—; line 28, after "of" insert —the form—; line 31, after "where" "N" should read —$N_1$—; line 44, "$\left(\frac{m+1}{7}\right)$" should read —$\left(\frac{m+1}{2}\right)$—.

Column 18, line 5 should appear as shown below:

$$K_{\left(\frac{m+1}{2}\right)^{N_i}-1} = \omega_2\alpha_{l_2}^{N_i}\#\omega_2\beta_{l_2}^{N_i}\# \cdots \#\omega_i\alpha_{l_i}^{N_i}\#\omega_i\beta_{l_i}^{N_i}\# \cdots \#\omega_m\alpha_{l_m}^{N_i}\#\omega_m\beta_{l_m}^{N_i}\#K_{\left(\frac{m+1}{2}\right)^{N_i-1}-1}$$

lines 14 to 24, "a", each occurrence, should read —$\alpha$—; line 29, at end of line, "$\beta q$" should read —$B_q$—; lines 36 through 38, "$\sum_{N^i=1}^{N}$" should read —$\sum_{N_1=1}^{N-1}$—, and "$\left(\frac{m-1}{2}\right)^N 1$" should read —$\left(\frac{M+1}{2}\right)^N 1$— lines 66 and 67, should appear as shown below:

$$K_n = \omega_3\alpha_{l_3}^{N}\#\omega_3\beta_{l_3}^{N}\# \cdots \#\omega_i\alpha_{l_i}^{N}\#\omega_i\beta_{l_i}^{N}\# \cdots \#\omega_m\alpha_{l_m}^{N}\#\omega_m\beta_{l_m}^{N}\#K\left(\frac{m+1}{2}\right)^{N_i-1}-1$$

Column 19, line 41, should appear as shown below:

$$K\left(\frac{m+1}{2}\right)^{N_i}-1 = \omega_3\alpha_{l_3}^{N_i}\#\omega_3\beta_{l_3}^{N_i}\# \cdots \#\omega_i\alpha_{l_i}^{N_i}\#\omega_i\beta_{l_i}^{N_i}\# \cdots \#\omega_m\alpha_{l_m}^{N_i}\#\omega_m\beta_{l_m}^{N_i}\#K\left(\frac{m+1}{2}\right)^{N_i-1}-1$$

line 54, "$[a^{p-1}$" should read —$[\alpha^{p-1}$—; line 69, "$\left(\frac{M+1}{1}\right)$" should read —$\left(\frac{M+1}{2}\right)$—. Column 20, line 20, "a" should read —$\alpha$—. Column 21, line 7, "a" should read —$\alpha$—; line 35, "$\left(\frac{m+1}{1}\right)$" should read —$\left(\frac{m+1}{2}\right)$—; line 39, "$^\alpha q/$" should read —$\alpha q'$—. Column 19, line 69, "$\beta^1 q \equiv \beta q$" should read —$\beta^1 q \equiv B_q$—.

Signed and sealed this 18th day of May 1971.

[SEAL]

Attest:

EDWARD M. FLETCHER, JR.,
*Attesting Officer.*

WILLIAM E. SCHUYLER, JR.,
*Commissioner of Patents.*